US010569738B2

(12) United States Patent
Thomas et al.

(10) Patent No.: US 10,569,738 B2
(45) Date of Patent: Feb. 25, 2020

(54) SEAT BELT ROUTING SENSING SYSTEMS AND SENSORS AND CORRESPONDING VEHICLE SYSTEMS OPERATING BASED ON WHETHER SEAT BELTS ARE PROPERLY WORN

(71) Applicant: GM Global Technology Operations LLC, Detroit, MI (US)

(72) Inventors: Scott D. Thomas, Novi, MI (US); George Helou, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 15/850,944

(22) Filed: Dec. 21, 2017

(65) Prior Publication Data

US 2019/0193676 A1     Jun. 27, 2019

(51) Int. Cl.
*B60R 22/48* (2006.01)
*B60R 22/18* (2006.01)

(52) U.S. Cl.
CPC .............. *B60R 22/48* (2013.01); *B60R 22/18* (2013.01); *B60R 2022/1818* (2013.01); *B60R 2022/485* (2013.01); *B60R 2022/4866* (2013.01); *B60R 2022/4891* (2013.01)

(58) Field of Classification Search
CPC ............ B60R 22/48; B60R 2022/4866; B60R 2022/4891; B60R 2022/485
See application file for complete search history.

(56) References Cited

U.S. PATENT DOCUMENTS

| | | | |
|---|---|---|---|
| 6,447,010 B1* | 9/2002 | Curtis | B60R 21/01516 280/735 |
| 7,086,297 B2* | 8/2006 | Blakesley | B60R 22/18 73/862.474 |
| 2014/0021710 A1* | 1/2014 | Rao | B60R 22/1951 280/806 |
| 2014/0132056 A1* | 5/2014 | Yilma | B60R 22/20 297/481 |
| 2017/0129399 A1* | 5/2017 | Appukutty | B60Q 9/00 |
| 2017/0296128 A1* | 10/2017 | Aoki | A61B 5/024 |

* cited by examiner

*Primary Examiner* — Darlene P Condra

(57) ABSTRACT

A seat belt routing sensing system for a seat belt of a vehicle is provided. The seat belt includes a latch plate. The seat belt routing sensing system includes a seat belt buckle mounting assembly and a sensor. The seat belt buckle mounting assembly includes a first bracket or a first strap. The first bracket or the first strap is configured to connect to a seat belt buckle. The sensor is attached directly or indirectly to the first bracket, the first strap, or the seat belt buckle and is configured to detect changes in a parameter. The changes are indicative of (i) at least one of a bending moment, a force, an angular position, or an angular movement of the first bracket or first strap, and (ii) routing of the seat belt.

20 Claims, 19 Drawing Sheets

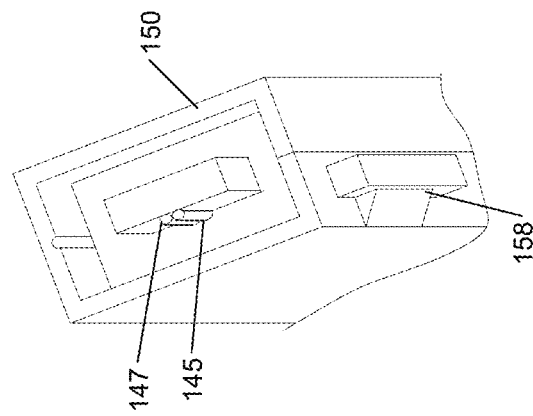
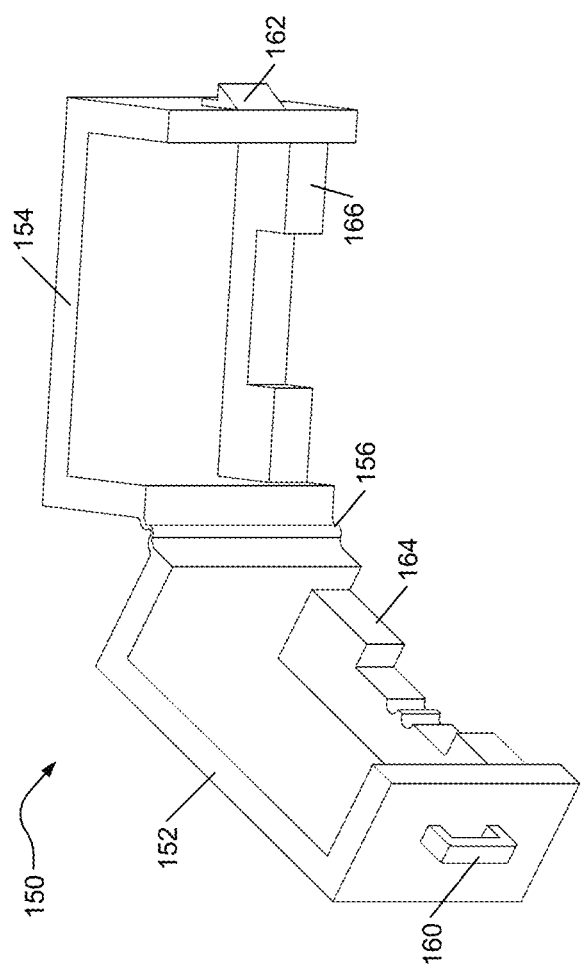
FIG. 9B
FIG. 9A

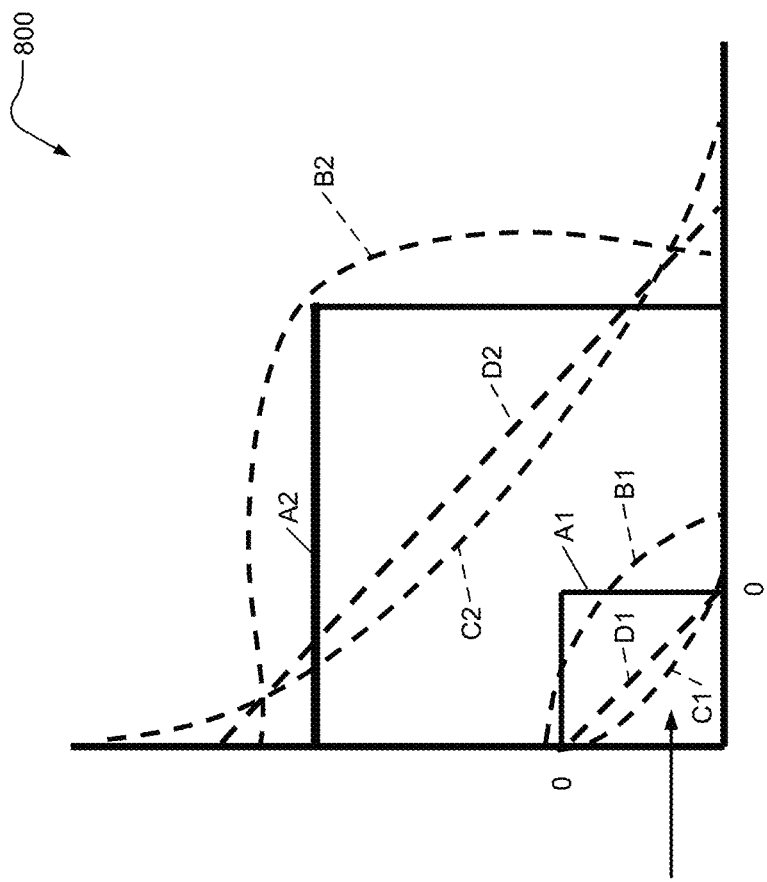
FIG. 22
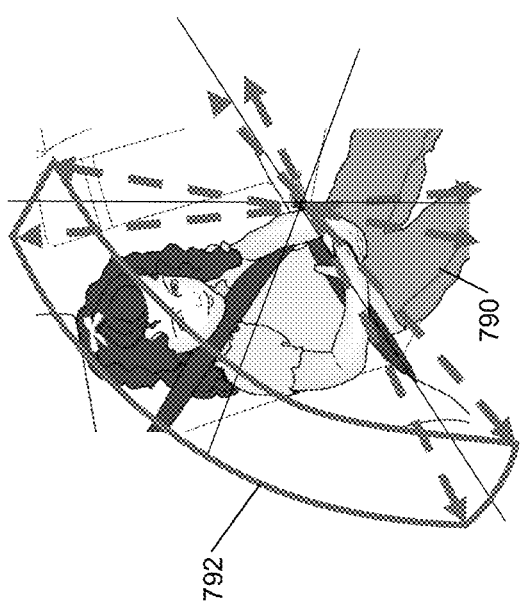

SEAT BELT ROUTING SENSING SYSTEMS AND SENSORS AND CORRESPONDING VEHICLE SYSTEMS OPERATING BASED ON WHETHER SEAT BELTS ARE PROPERLY WORN

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle occupant safety, and more particularly to seat belt monitoring systems.

Seat belts are worn by vehicle occupants to prevent injury in the event of a vehicle collision. Seat belts have been proven to greatly reduce risk of an injury during an accident. Some modern vehicle systems include sensors for detecting which vehicle seats on which vehicle occupants are sitting and whether seat belts of these seats are buckled. These systems are more frequently utilized for front seats of a vehicle. However, in the future, there may be more frequent usage of these systems in other seating positions and different unconventional seating positions in autonomous vehicles. With these systems, if a seat belt is not buckled, the vehicle systems provide audible and visual warnings indicating that a seat belt is not buckled.

Some vehicle occupants choose not to wear a seat belt and go to great lengths to avoid and/or trick vehicle electronic systems into operating as if the vehicle occupants are wearing a seat belt. For example, a vehicle occupant that prefers not to wear a seat belt may buckle the seat belt and then sit on the seat belt, as opposed to wearing the seat belt. As another example, a vehicle occupant may wrap the seat belt behind the seat and insert a latch plate of the seat belt into a seat belt buckle (referred to as "buckling the seat belt"). As yet another example, a vehicle occupant may insert a fake latch plate into a seat belt buckle, thereby tricking the vehicle electronic system into operating as if the appropriate seat belt latch plate were inserted in the seat belt buckle.

Some vehicle occupants improperly wear seat belts. A seat belt is typically designed to provide a lap belt portion (or "lap belt") and a shoulder belt portion (or "shoulder belt"). The lap belt is meant to be generally worn over the waist and/or pelvic region of a vehicle occupant. The shoulder belt is meant to be worn over the shoulder and torso of a vehicle occupant. The lap belt and the shoulder belt limit forward movement of a vehicle occupant during an accident. Some vehicle occupants have sat on lap belts and/or placed shoulder belts behind their back, under their shoulder, around their torso and not over their shoulder, or on the wrong side of the head, which are improper routing of the seat belt and increase risk of injury in the event of an accident.

SUMMARY

A seat belt routing sensing system for a seat belt of a vehicle is provided. The seat belt includes a latch plate. The seat belt routing sensing system includes a seat belt buckle mounting assembly and a sensor. The seat belt buckle mounting assembly includes a first bracket or a first strap. The first bracket or the first strap is configured to connect to a seat belt buckle. The sensor is attached directly or indirectly to the first bracket, the first strap or the seatbelt buckle and is configured to detect changes in a parameter. The changes are indicative of (i) at least one of a bending moment, a force, an angular position, or an angular movement of the first bracket or first strap, and (ii) routing of the seat belt.

In other features, the sensor is configured to output a signal indicative of a mass and vibration pattern or harmonics experienced by the first bracket, the first strap, or the seat belt buckle.

In other features, the seat belt routing sensing system further includes a Wheatstone bridge, where the sensor is attached to the first bracket. The Wheatstone bridge includes the sensor.

In other features, the seat belt buckle mounting assembly further includes at least one joint and the at least one joint is gimbaled or bendable.

In other features, the seat belt buckle mounting assembly includes a second bracket, and one of a cable and a pivot providing the at least one joint. The first bracket and the second bracket are attached to the at least one joint. The sensor is mounted one of the first bracket and the second bracket.

In other features, the seat belt routing sensing system further includes a routing member attached to one of the first bracket and the second bracket. The cable is wrapped around the routing member and held on to the one of the first bracket or the second bracket to which the routing member is attached. Ends of the cable are attached to the other one of the first bracket or the second bracket to which the routing member is not attached.

The seat belt routing sensing system includes the first bracket and the first strap. The first bracket has an offset portion, a first end and a second end. The first strap extends over the offset portion. A first end of the first strap is attached to the first end of the first bracket. A second end of the first strap is attached to the second end of the first bracket. The sensor is attached to the strap.

The seat belt routing sensing system includes the first bracket and the strap and further includes a second bracket. The first bracket and the second bracket together provide at least a portion of a pivot having an offset portion. The first strap extends over the offset portion. A first end of the first strap is attached to the first bracket. A second end of the first strap is attached to the second bracket. The sensor is attached to the strap.

In other features, the seat belt routing sensing system includes the first bracket, and further includes a shield. The shield is configured to attach to the first bracket and cover at least one of the sensor or the seat belt buckle.

In other features, the seat belt routing sensing system includes the first bracket and the first strap and further includes: at least one joint including at least one of a gimbaled joint, a first bendable joint or a second bendable joint; a second bracket connected to the first bracket via the at least one joint, where the first strap is connected to the first bracket and the second bracket, and where the sensor is attached to the first strap; a second strap connected to the first bracket and the second bracket; and a second sensor attached to the second strap.

In other features, the seat belt routing sensing system includes the first bracket and the first strap and further includes: a second bracket, where the first strap is connected to the first bracket and to the second bracket, where the second bracket is configured to be actuated relative to the first bracket via a pivot, and wherein the first strap extends across the pivot; and a first holding member attached to at least one of the first bracket or the second bracket and configured to hold the sensor.

In other features, the seat belt routing sensing system further includes: a mounting member; and a first strap including a spring portion and an elongated portion, where the spring portion is disposed on a first side of the first holding member, and the elongated portion is disposed on a second side of the first holding member.

In other features, the seat belt routing sensing system further includes a third bracket (i) connected to and configured to pivot relative to the first bracket in a first angular direction associated with a first plane, and (ii) connected to the second bracket and configured to pivot relative to the second bracket in a second angular direction associated with a second plane.

In other features, the seat belt routing sensing system further includes: a second sensor; a second strap connected to the first bracket and to the second bracket; and a second holding member attached to one of the first bracket and second bracket and configured to hold the second sensor.

In other features, a vehicle system is provided and includes: the seat belt routing sensing system; a seat belt module configured to generate an output signal based on an output of the sensor; and at least one of (i) an occupant warning module configured to, based on the output signal, generate a warning to the occupant, or (ii) a vehicle control module configured to, based on the output signal, generate a control signal to prevent or limit operation of a propulsion system of the vehicle.

In other features, a method of operating a vehicle system based on whether a seat belt is properly worn is provided. The method includes: detecting, via a sensor, a parameter of a bracket, a strap, or the seat belt buckle of a seat belt routing sensing system, where the parameter is a bending moment, a force, an angular position, or an angular movement of the bracket or first strap, where the bracket or strap is connected to a seat belt buckle; comparing the parameter to thresholds to determine if the parameter is within a predetermined range, where the predetermined range corresponds to a seat belt being worn properly; if the parameter is within the predetermined range, determining that the seat belt is properly worn and permitting certain vehicle operations; and if the parameter is outside the predetermined range, determining that the seat belt is improperly worn and generating at least one of (i) a warning signal, or (ii) preventing or limiting the certain vehicle operations.

In other features, the method further includes: detecting, via the sensor, a mass and vibration pattern or harmonics of the bracket, the strap, or the seat belt buckle of a seat belt routing sensing system; performing a second comparison between the mass and vibration pattern or harmonics and a predetermined mass and vibration pattern or harmonics; and determining whether the seat belt is properly worn based on results of the second comparison.

In other features, the thresholds are modified by a seatbelt routing sensor correction factor determined based on at least one of a seat position sensor input or an occupant size sensor input.

In other features, the method further includes determining the seatbelt routing sensor correction factor based on at least one of a composite seat position or a composite occupant size.

In other features, the method further includes determining whether the seat belt is buckled based on the parameter. The determining of whether the seat belt is buckled is performed (i) independent of an output of a latch plate sensor of the seat belt buckle or (ii) without detecting an output of a latch plate sensor. The determining of whether the seat belt is properly worn is performed if the seat belt is determined to be buckled.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9A is a perspective view of an example of a clamshell configured for a portion of a seat belt buckle mounting assembly in accordance with an embodiment of the present disclosure;

FIG. 9B is a perspective view of the clamshell of FIG. 9A in a closed state;

FIG. 22 is a perspective view of a vehicle occupant illustrating an example of a detection sensitivity zone for two seat belt routing detection sensors and an example corresponding seat belt routing graph used to determine whether a seat belt is worn properly in accordance with an embodiment of the present disclosure;

In the drawings, reference numbers may be reused to identify similar and/or identical elements.

DETAILED DESCRIPTION

Seat belt routing sensing systems are disclosed herein including seat belt buckle mounting assemblies and seat belt routing detection sensors (hereinafter "routing detection sensors") that provide information indicative of a routing state of a corresponding seat belt. The information may include signals and/or data indicative of bending moment, force, angular position, angular movement and/or orientation of seat belt system components. Based on this information, seat belt routing of the seat belts can be determined. Seat belt routing refers to a current routing state of shoulder and lap belts, as further described below. Vehicle systems and methods are also disclosed that: detect vehicle occupants; monitor outputs of seat belt sensors including the routing detection sensors and/or outputs of corresponding circuits; and based on the outputs and received information; determine routing of the seat belts and whether the seat belts are worn properly. The vehicle systems perform countermeasures in the event that one or more seat belts are detected as not being worn properly.

Figure 1:
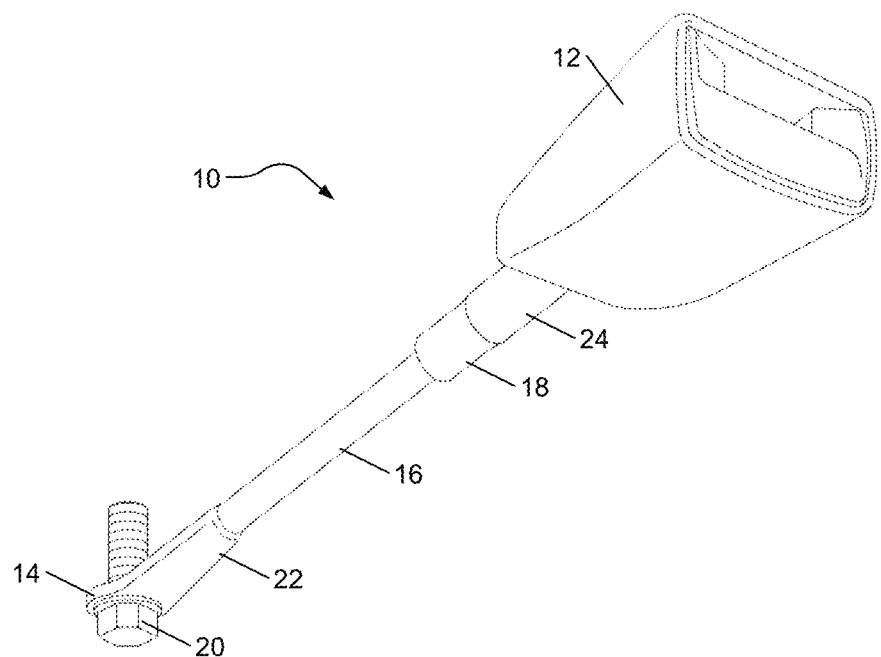
FIG. 1 is a perspective view of an example of a seat belt buckle mounting assembly for a seat belt buckle including a cable, which is provided to show possible locations for seat belt routing detection sensors in accordance with embodiments of the present disclosure.

Various seat belt buckle mounting assemblies are described herein. FIG. 1 shows a seat belt buckle mounting assembly 10 for a seat belt buckle 12. The seat belt buckle mounting assembly 10 includes a first bracket 14, a cable 16, and a second bracket 18. The first bracket 14 may be fastened to a floor, a seat, or frame of a vehicle via a fastener 20 and to the cable 16. The first bracket 14 may be crimped onto or otherwise mechanically attached to the cable 16. A first cover 22 (or sleeve) may be placed over at least a portion of the first bracket 14. The second bracket 18 may be crimped onto or otherwise mechanically attached to a second end of the cable 16. A second cover 24 (or sleeve) may be placed over at least a portion of the second bracket 18. The seat belt buckle 12 (or buckle assembly) may be connected to the second bracket 18 and include a latch plate sensor (not shown) to detect when a seat belt latch plate is inserted in and latched to the seat belt buckle 12.

Figure 2:
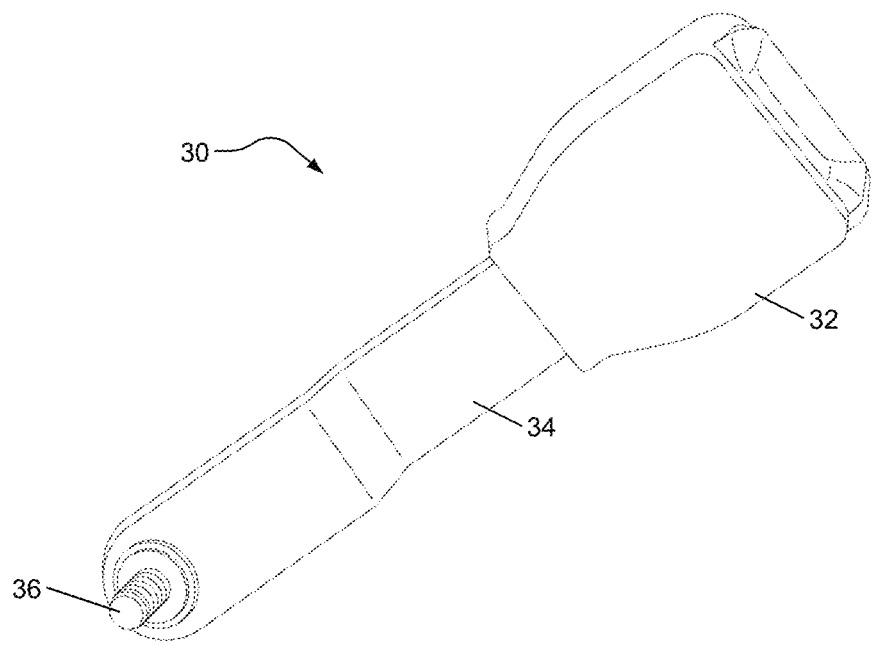
FIG. 2 is a perspective view of another example of a seat belt buckle mounting assembly for a seat belt buckle including a bracket, which is provided to show possible locations for seat belt routing detection sensors in accordance with embodiments of the present disclosure.

FIG. 2 shows a seat belt buckle mounting assembly 30 for a seat belt buckle 32. The seat belt buckle mounting assembly 30 includes a bracket 34 that may be fastened to a floor, a seat, or frame of a vehicle via a fastener 36 and to the seat belt buckle 32. The seat belt buckle 32 may be connected to the bracket 34 and include a latch plate sensor (not shown) to detect when a seat belt latch plate is inserted in and latched to the seat belt buckle 32.

As disclosed herein, routing detection sensors may be attached to various locations on the seat belt buckle mounting assemblies 10, 30 of FIGS. 1-2 and may be used to detect bending moment, force, angular position, and/or angular movement. One or more routing detection sensors may be mounted on or at points along, for example, one or more of each of the brackets 14, 18, 34, the cable 16, and/or in the seat belt buckles 12, 32. Each of the stated components may include any number of sensors or no sensors. In total, one or more sensors may be used. The seat belt buckle mounting assemblies 10, 30 may be modified to accommodate the routing detection sensors. One or more sensors may be included to detect parameters for single-axis, dual-axis, or triple-axis configurations. As an example, bending moment, force, angular position, and/or angular movement may be detected at one or more of the stated components. Example single axis configurations and systems are disclosed with respect to at least FIGS. 10, 13 and 14. Example dual axis configurations and systems are disclosed with respect to at least FIGS. 15 and 18. The routing detection sensors referred to herein may be included in seat belt sensor circuits, such as the seat belt sensor circuits identified with respect to FIG. 19.

The routing detection sensors referred to herein may include moment sensors, force sensors, angular position sensors, and/or angular movement sensors. The moment sensors may include strain gauges, thin film strain gauges, semiconductor strain gauges, piezoresistors, nano-particle based strain gauges, fiber optic sensors, microscale strain gauges, capacitive strain gauges, vibrating wire strain gauges, etc. The force sensors may include strain gauges, strain gauge load cells, electrical resistive strain gauges, foil strain gauges, semiconductor strain gauges, thin film strain gauges, wire strain gauges, piezoelectric force transducers, load cells, elastic sensors, magneto-elastic sensors, vibration sensors, plastic deformation sensors, etc.

The angular position or movement sensors may include capacitive transducers, capacitive displacement sensors, Eddy-current sensors, ultrasonic sensors, grating sensors, Hall effect sensors, inductive non-contact position sensors, laser Doppler vibrometers linear variable differential transformers (LVDTs), multi-axis displacement transducers, photodiode arrays, piezo-electric transducers, potentiometers, proximity sensors, rotary sensors, seismic displacement pick-up sensors, string potentiometers, magnetic sensors, magnetorestrictive sensors, optical sensors, etc. Each sensor may be used to detect one or more parameters.

As an example, the strain gauges may be thin film strain gauges including resistive elements that change in resistance when the corresponding strain gauge is deformed. This resistance change may be measured using, for example, Wheatstone bridge circuits, such as quarter-bridge, half-bridge or full-bridge circuits. A quarter-bridge circuit may be used when monitoring output of a single strain gauge. A half-bridge circuit may be used when monitoring outputs of two strain gauges. A full-bridge circuit may be used when monitoring output of four strain gauges. In one embodiment, a dual-strain gauge configuration and a half-bridge circuit are used because this minimizes the number of sensors while providing temperature compensation. In another embodiment, a four strain gauge configuration and a full-bridge circuit are used, which provides additional information and temperature compensation.

Figure 25:
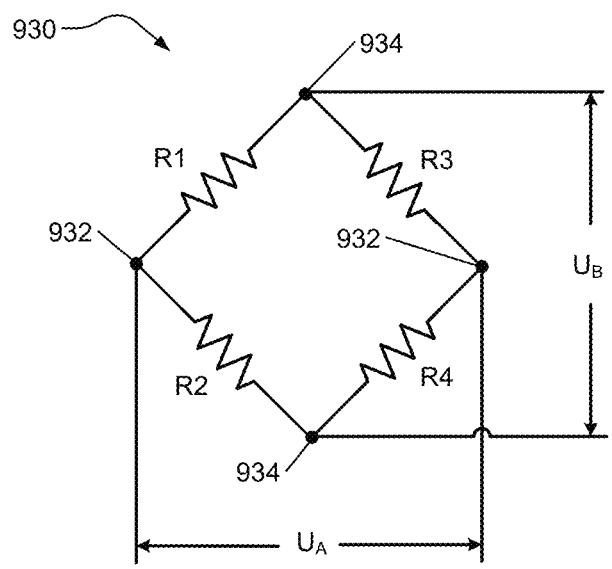
FIG. 25 is a schematic view of a Wheatstone bridge.

FIGS. 8A, 10-11, and 13-15 are examples of sensor configurations for which Wheatstone bridge circuits may be used. The Wheatstone bridge circuits may be included in the stated seat belt sensor circuits. The strain gauges may be used in replacement of corresponding resistances of a Wheatstone bridge. In a quarter-bridge configuration, one of the four resistances of the Wheatstone bridge is replaced with the strain gauge, such as the strain gauge shown in FIGS. 8A, 10 and 13-14. In a half-bridge configuration two of the resistances of the Wheatstone bridge are replaced respectively with two strain gauges, such as the strain gauges shown in FIGS. 11 and 15. In a full-bridge configuration, the four resistances of the Wheatstone bridge are replaced with four strain gauges. Power sources may supply power to two points of the Wheatstone bridge and output detected at the other two points of the Wheatstone bridge may be monitored. An example Wheatstone bridge is shown in FIG. 25.

Figure 3:
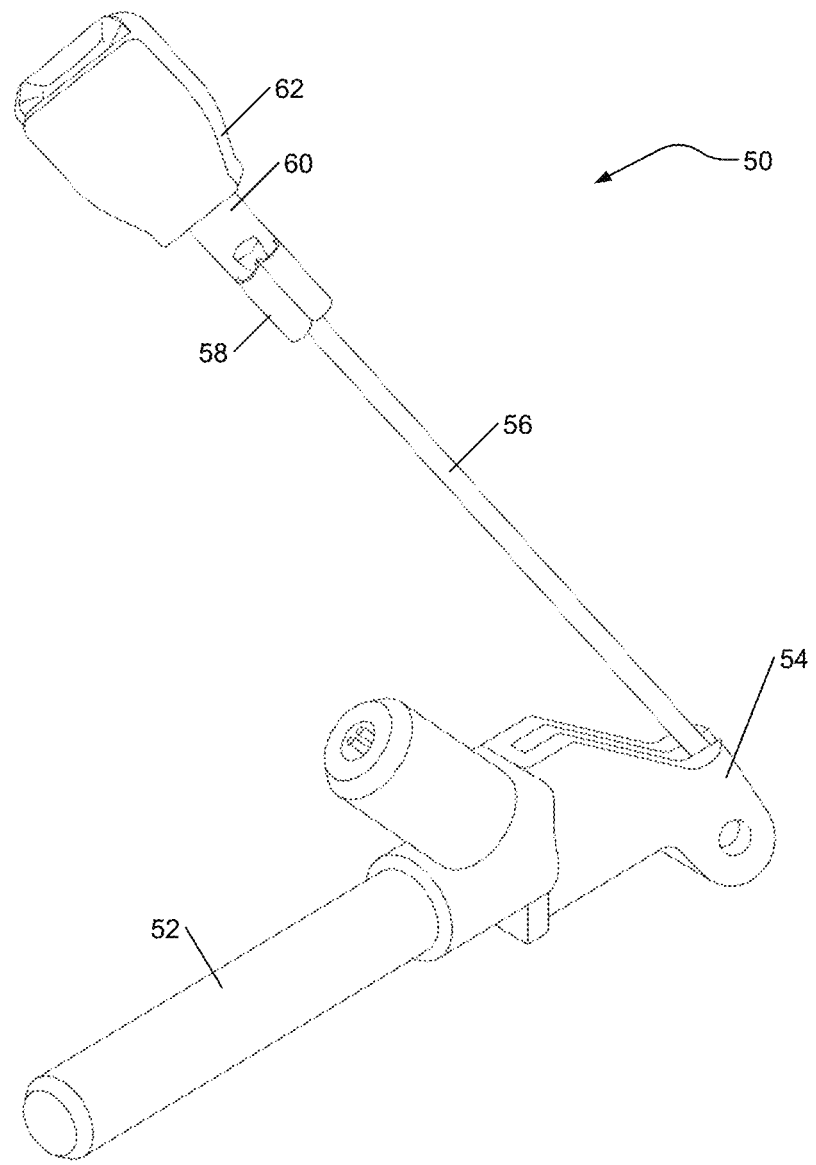
FIG. 3 is a perspective view of an example of a seat belt pretensioner assembly, which is provided to show possible locations for seat belt routing detection sensors in accordance with embodiments of the present disclosure.

FIG. 3 shows a seat belt pretensioner assembly 50 that includes a seat belt pretensioner 52, a mounting bracket 54, a cable 56, a crimp connector 58, buckle bracket 60 and a seat belt buckle 62. The seat belt buckle 62 is attached to the buckle bracket 60. The crimp connector 58 is crimped on to the buckle bracket 60 and the cable 56. The cable 56 extends into the mounting bracket 54 and to the pretensioner 52. The pretensioner 52 is connected to the mounting bracket 54. When a collision is imminent and/or detected, the pretensioner 52 is triggered, which pulls the cable 56 towards the mounting bracket 54, thereby tightening a seat belt buckled to the seat belt buckle 62. This further limits forward motion of a vehicle occupant during a collision.

Routing detection sensors may be attached to various locations on the seat belt pretensioner assembly 50 and may be used to detect bending moment, force, and angular position or movement. One or more routing detection sensors may be mounted on or at points along, for example, one or more of each of the brackets 54, 60, the cable 56, and the crimp connector 58 (or mechanical interface) between the cable 56 and the buckle bracket 60, and/or in the seat belt buckle 62. Each of the stated components may include any number of sensors or no sensors. In total, one or more sensors may be used. One or more sensors may be included to detect parameters for single-axis, dual-axis, or triple-axis configurations. As an example, bending moment, force, angular position, and/or angular movement may be detected at one or more of the stated components.

Figure 4:
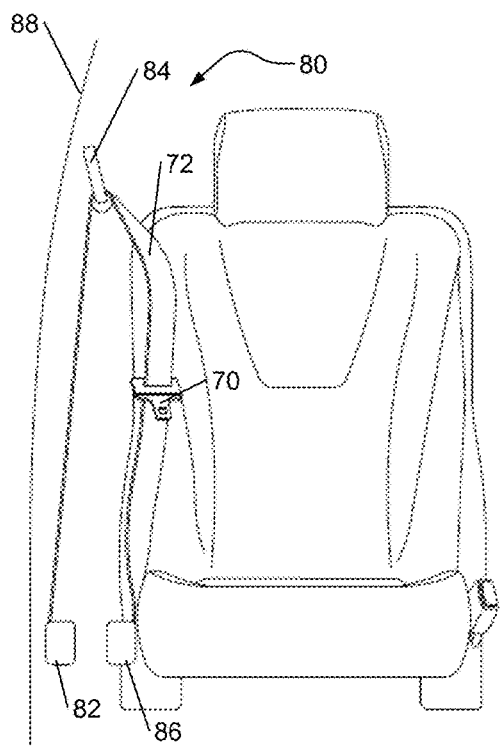
FIG. 4 is a front view of an example of a dual retractor seat belt assembly having a seat belt guide loop.

FIGS. 4-7 show different seat belt assembly configurations that are applicable to the seat belt buckle mounting assemblies, seat belt routing sensing systems, and vehicle systems disclosed herein. In FIGS. 4-7 four different seat belt assemblies are shown for respective seats. Each of the seat belt assemblies has a seat belt buckle latch plate 70, which is inserted in a seat belt buckle, such as one of the seat belt buckles described herein. In FIGS. 4-7 seat belts 72, 74, 76, 78 are shown for corresponding seats. FIG. 4 shows a dual retractor seat belt assembly 80 including a first retractor 82, a seat belt guide loop 84, and a second retractor 86. The first retractor 82 and the seat belt guide loop 84 are attached to, for example, a frame or pillar 88 of a vehicle. The second retractor 86 is mounted to the corresponding seat or a floor of a vehicle. An alternative approach (not shown) is that the first retractor could be mounted to a position on the vehicle near the guide loop 84 with or without the inclusion of the guide loop.

Figure 5:
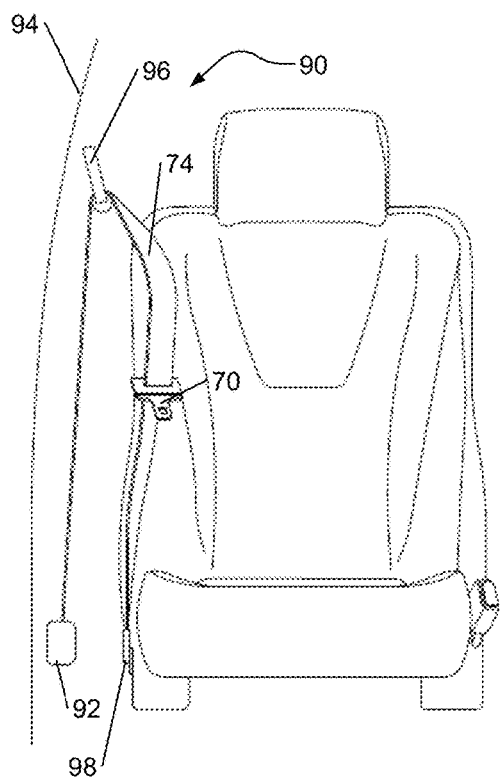
FIG. 5 is a front view of an example of a single retractor seat belt assembly having a frame or pillar mounted retractor, a seat belt guide loop and a fixed attachment point.
Figure 6:
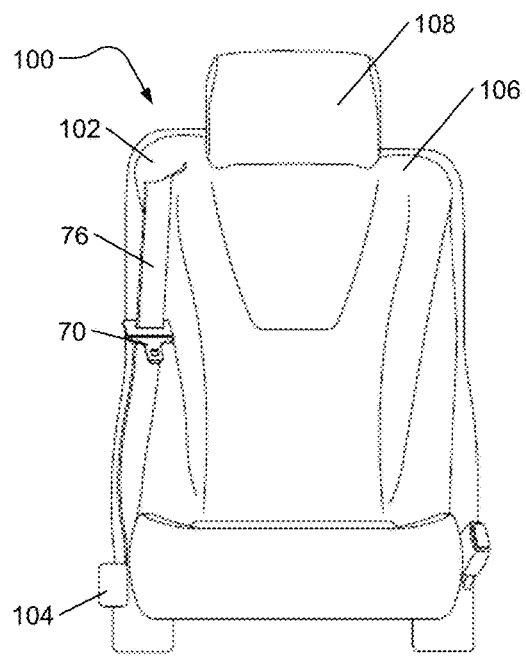
FIG. 6 is a front view of an example of a dual retractor seat belt assembly including a shoulder mounted retractor.
Figure 7:
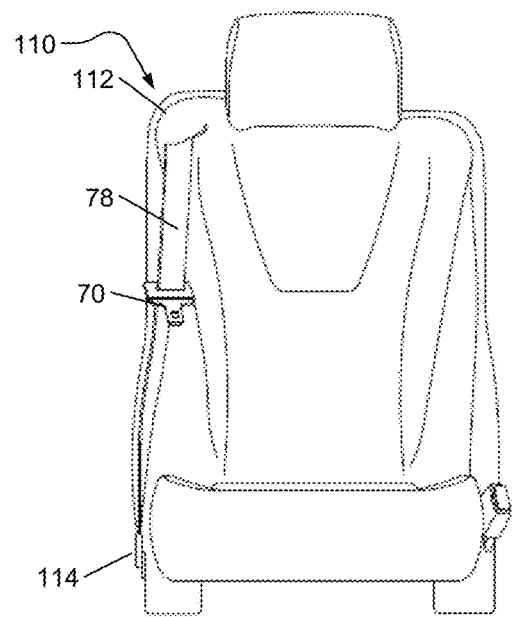
FIG. 7 is a front view of an example of a single retractor seat belt assembly including a fixed attachment point.

FIG. 5 shows a single retractor seat belt assembly 90 including retractor 92 mounted to a frame or pillar 94, a seat belt guide loop 96 and a fixed attachment point 98. The fixed attachment point 98 (or bracket at an end of a corresponding seat belt) may be mounted to the corresponding seat or a floor of a vehicle. An alternative approach (not shown is that the retractor 92 could be mounted to a position on the vehicle near the guide loop 96 with or without the inclusion of a guide loop 96. FIG. 6 shows a dual retractor seat belt assembly 100 including a shoulder mounted retractor 102 and a second retractor 104 mounted to the corresponding seat or a floor of a vehicle. The shoulder mounted retractor 102 is mounted on a top of a seat back 106 adjacent to a head restraint 108 (or head rest). The seat belt buckle latch plate 70 of FIGS. 4 and 6 may be configured to slide on the corresponding seat belt and thus be position adjustable relative to the seat belt. In another implementation, the seat belt buckle latch plate 70 of FIGS. 4 and 6 may be sewn to the corresponding seat belt and not be position adjustable relative to the seat belt. FIG. 7 shows a single retractor seat belt assembly 110 including a shoulder mounted retractor 112 and a fixed attachment point 114. The fixed attachment point 114 (or bracket at an end of a corresponding seat belt) may be mounted to the corresponding seat or a floor of a vehicle. The seat belt buckle latch plate 70 of FIGS. 5 and 7 may be configured to slide on the corresponding seat belt and thus be position adjustable relative to the seat belt.

Figure 8B:
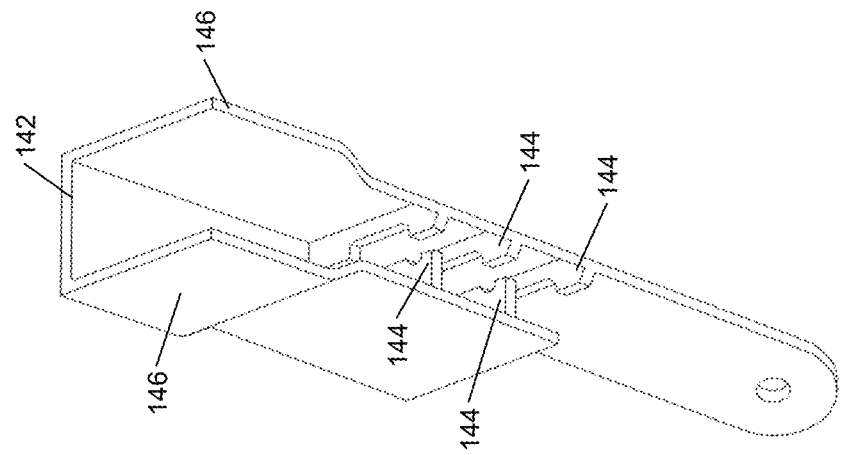
FIG. 8B is perspective view of the shield of FIG. 8A.
Figure 8A:
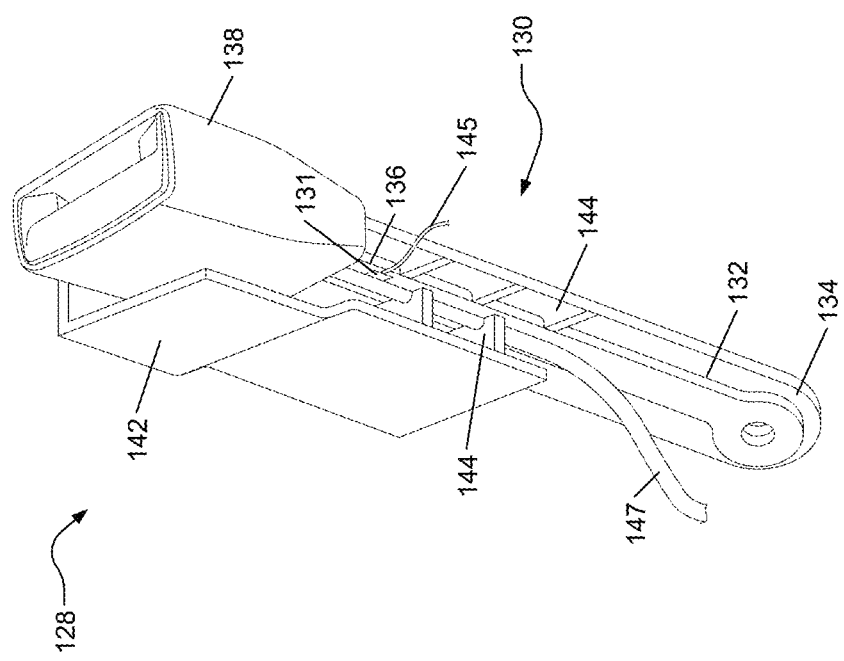
FIG. 8A is a perspective view of an example of a portion of a seat belt routing sensing system including a seat belt buckle mounting assembly having a seat belt routing detection sensor and a shield in accordance with an embodiment of the present disclosure.

FIGS. 8A and 8B show a seat belt routing sensing system 128 including a seat belt buckle mounting assembly 130 and a routing detection sensor 131. The seat belt buckle mounting assembly 130 includes a bracket 132 having a first end 134 configured for a fastener and a second end 136 connected to a seat belt buckle 138. As an example, the bracket 132 may be a metal band on which one or more routing detection sensors (one routing detection sensor 131 is shown) is mounted. Although the routing detection sensor 131 is shown on the bracket 132 outside of the seat belt buckle 138, the sensor 131 may be located internal to the seat belt buckle 138. Also, by having the sensor mounted on the bracket 132, the sensor is not in contact with and/or is isolated from a seat and/or a center console of a corresponding vehicle.

A shield 142 may be attached to the bracket 132 and may include inner ribs 144 and cover at least side portions of the seat belt buckle mounting assembly 130 to minimize contact with the seat belt buckle 138, routing detection sensor 131 and the corresponding wire 145. The shield 142 would be preferably attached to the bracket 132 below the routing detection sensor 131, such that the routing detection sensor 131 and the seat belt buckle 138 are isolated from contacts to the side of the seatbelt buckle mounting assembly 130 by the shield 142. In an alternative embodiment, side walls 146 of the shield 142 directly contact the bracket 132. The inner ribs 144 allow the shield 142 to snap on to the bracket 132 and provide spacing for wire routing. A latch plate sensor for detecting whether a seat belt is buckled to the seat belt buckle 138 may be located in the seat belt buckle 138 and have a corresponding wire 147.

The shield 142 may cover a portion or all of the seat belt buckle 138. In the example shown, the shield 142 covers a portion of the buckle 138. Gaps may exist between (i) the shield 142 and (ii) the buckle 138, the routing detection sensor 131 and the bracket 132, which allows the buckle 138 and at least a portion of the bracket 132 to move within and relative to the shield 142. This movement including bending moment, force, angular position, and/or angular movement of the bracket 132 may be detected by the routing detection sensors. The shield 142 may limit angular movement of the buckle 138 and the bracket 132. The shield 142 may isolate some or all of a portion of the bracket 132, the routing detection sensor 131, and at least a portion of the seat belt buckle 138 from a vehicle occupant, a seat, adjacent components, and/or a center console.

The bracket 132 and the shield 142 may be formed of various materials. In one embodiment, the bracket 132 is formed of steel and the shield 142 is formed of plastic, however other suitable materials may be used. The bracket 132 may be formed of a flexible and bendable material that exhibits different amounts of bending, depending on seat belt routing.

FIGS. 9A and 9B show small cross-sectional portions of a shield configured as a clamshell 150 in open and closed states. The clamshell 150 may be used for a portion of a seat belt buckle mounting assembly. For example, the clamshell 150 may be used to surround a portion of the seat belt buckle mounting assembly 130 of FIG. 8A including a latch plate sensor wire 147, one or more routing detection sensor(s) and corresponding wire(s) 145. The shield configured as a clamshell 150 includes two halves 152, 154 that are 'U'-shaped and attached at a first end via a hinge 156 and at a second end via a latch 158. The latch 158 includes a member 160 that protrudes from the first half 152 and a tab 162 that extends from the second half 154. The tab 162 has a triangular-shaped end that is inserted between the member 160 and the first half 152 and allows the tab 162 to hook the member 160 to prevent the clamshell 150 from opening. Each half of the clamshell 150 may include one or more 'U'-shaped member (e.g., one of the members 164, 166) that extends inward, around, contacts and presses against the bracket when the clamshell 150 is in a closed state. This prevents the clamshell 150 from moving relative to the bracket. The clamshell 150 may be formed of various materials. In one embodiment, the clamshell 150 is formed of plastic and/or other suitable materials.

Figure 10:
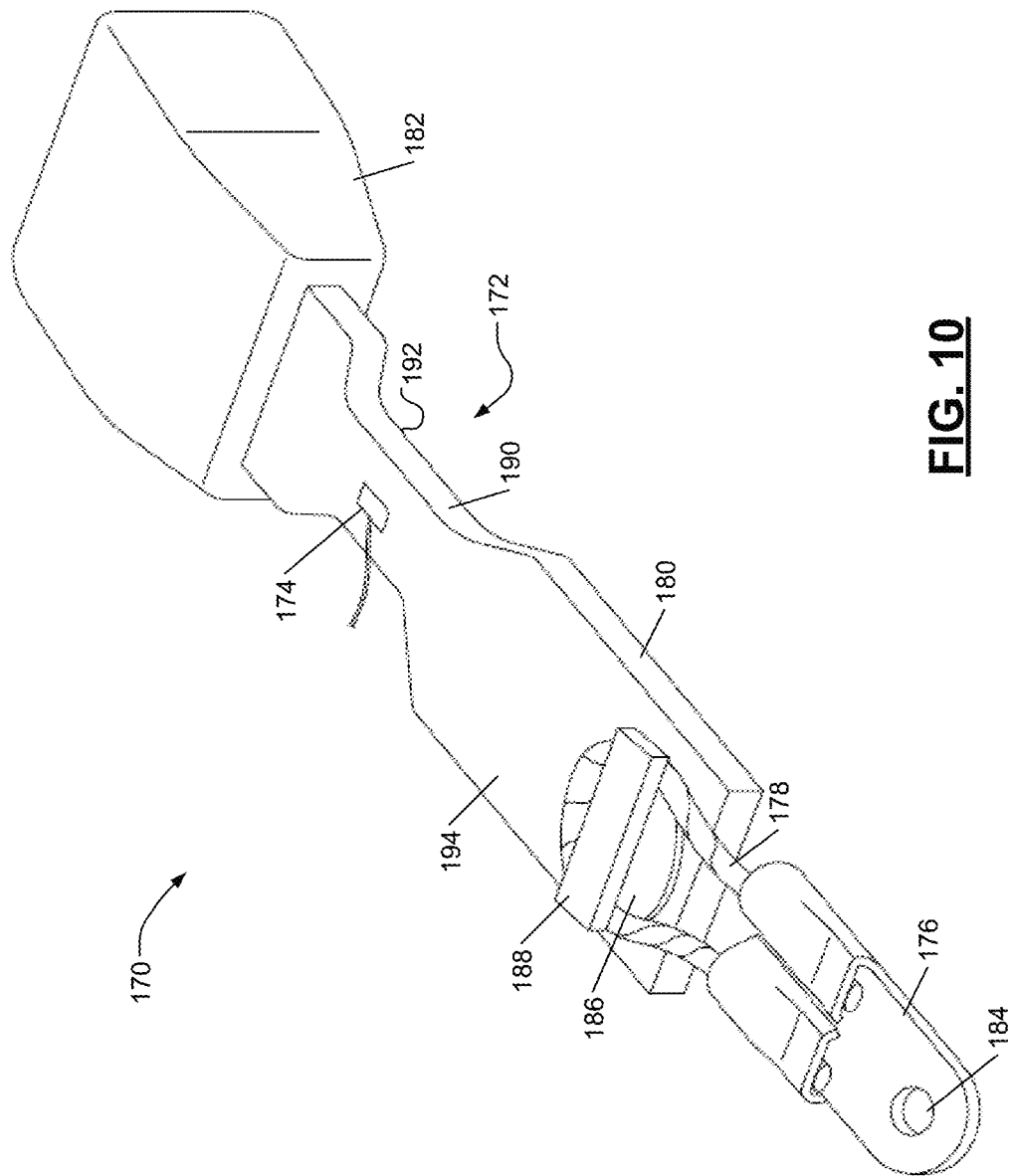
FIG. 10 is a perspective view of an example of a single-axis non-pivoting seat belt routing sensing system including a seat belt routing detection sensor in accordance with an embodiment of the present disclosure.

FIG. 10 shows a single axis non-pivoting seat belt routing sensing system 170 that includes a seat belt buckle mounting assembly 172 and a routing detection sensor 174. The seat belt buckle mounting assembly 172 includes a first bracket 176, a cable 178, a second bracket 180, and a seat belt buckle 182. The first bracket 176 is crimped on to two ends of the cable 178 and may be fastened to a floor, a seat, or a frame of a vehicle via a fastener opening (or hole) 184. The cable 178 loops around a circular routing member 186, which extends from the second bracket 180 and beneath a tab 188 that is attached to and overhangs the circular routing member 186. The cable 178 allows the second bracket 180 and the seat belt buckle 182 to rotate relative to the first bracket 176 in one or more directions. In one embodiment, the cable 178 and the first bracket 176 are not included, and the second bracket 180 is directly fastened to a floor, a seat, or a frame of a vehicle.

The second bracket 180 may optionally have a tapered inward section 190 on which one or more routing detection sensors are attached. The second bracket 180 may be locally twisted to orient the routing detection sensors sensitivity along an axis of movement. The routing detection sensors may be mounted on a first side 192 or a second side 194 of the second bracket 180. A width of the second bracket 180 is less at the tapered inward section than at other sections of the second bracket 180. This provides a bendable joint and allows the second bracket 180 to bend more easily in the tapered section 190 and the routing detection sensors to detect this movement and/or corresponding bending moment and/or force applied. The seat belt buckle 182 is connected to the end of the second bracket 180 opposite the cable 178.

A shield (or sensor isolation sleeve) may be attached to the second bracket 180 of the seat belt buckle mounting assembly 172. The shield may be similar to the shield 142 of FIGS. 8A and 8B, or the clamshell 150 of FIGS. 9A and 9B and cover a portion of the second bracket 180 and/or the seat belt buckle 182. In one embodiment, the shield is attached to the second bracket 180 below the routing detection sensor 174. In one embodiment, the shield does not cover the first bracket 176 or covers a portion of the first bracket 176 and allows the second bracket 180 to move relative to the first bracket 176.

The bracket 176, the cable 178, and the second bracket 180 may be formed of various materials. In one embodiment, the bracket 176, the cable 178, and the second bracket 180 are formed of steel and/or other suitable materials. The second bracket 180 may be formed of a flexible and bendable material that exhibits different amounts of bending, depending on seat belt routing.

Figure 11:
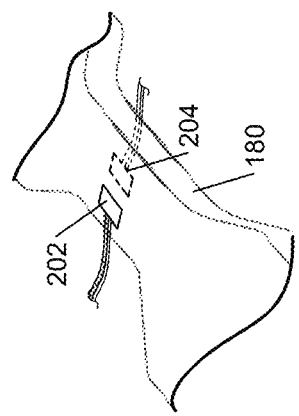
FIG. 11 is a perspective view of an example of a portion of a bracket of a seat belt buckle mounting assembly of the single-axis non-pivoting seat belt routing sensing system of FIG. 10 including two seat belt routing detection sensors in accordance with an embodiment of the present disclosure.

FIG. 11 shows a portion 200 of the second bracket 180 illustrating use of two routing detection sensors 202, 204. A first one of the routing detection sensors 202 may be mounted on a first side of the second bracket 180 and the second one of the routing detection sensor 204 may be mounted on a second side of the second bracket 180 opposite the first side. For another option, the routing detection sensors 202, 204 are mounted on a same side of the bracket routing. Although two sensors are shown, any number of sensors may be included. In one embodiment, a same number of sensors are on the second side as on the first side of the second bracket 180. In addition, sensors may also be located on the edge walls of the second bracket 180. Depending on what is being sensed and the directions of the sensing axes, the sensors may be oriented in different locations.

Figure 12:
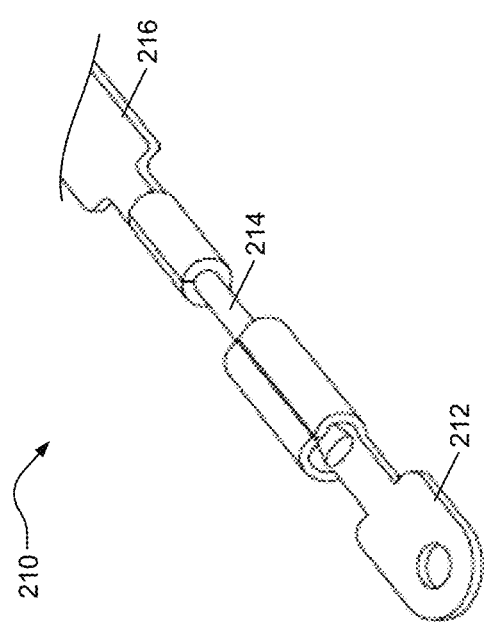
FIG. 12 is a perspective view of an example of a fastening portion of a seat belt buckle mounting assembly in accordance with an embodiment of the present disclosure.

FIG. 12 shows a fastening portion 210 of a seat belt buckle mounting assembly. The fastening portion 210 may replace the first bracket 176, cable 178, circular separation member 186 and tab 188 of FIG. 10. The fastening portion 210 includes a first bracket 212, a cable 214, and a second bracket 216 (or modified version of the second bracket 180). The first bracket 212 is crimped on to a first end of the cable 214. In addition, an end of the second bracket 216 is crimped on to a second end of the cable 214. The second bracket 216 may be similar to the second bracket 180 of FIG. 10, but has an end configured to be crimped on to the cable 214. The cable 214 allows the second bracket 216 to move relative to the first bracket 176.

Figure 13:
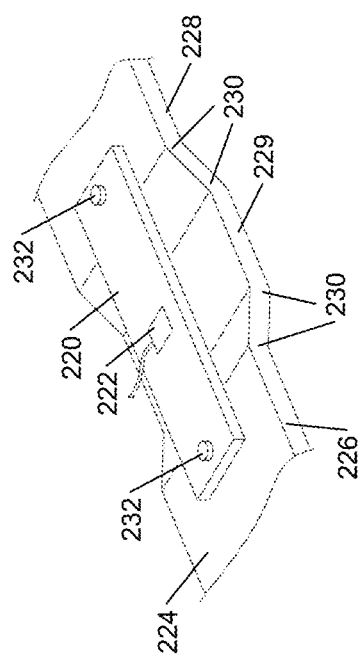
FIG. 13 is a perspective view of an example of a bridge strap for a seat belt routing detection sensor mounted on a bracket of a seat belt buckle mounting assembly in accordance with an embodiment of the present disclosure.

FIG. 13 shows a bridge strap 220 for a routing detection sensor 222 mounted on a bracket 224 of a seat belt buckle mounting assembly. FIG. 13 shows a modified version of the second bracket 180 of FIG. 10. The bracket 224 includes a first end 226, a second end 228, and an offset portion 229 with four bends 230 between the first end 226 and the second end 228. The bridge strap 220 provides a sensitive forcer bearing member and extends across the offset portion 229 and attaches to the first end 226 and the second end 228 via, for example, fasteners 232 (e.g., rivets, threaded fastener, snap-in fasteners, etc.). One or more routing detection sensors 222 are attached to the bridge strap 220 over the offset portion 229 of the bracket 224. In one embodiment, the bridge strap 220 is welded to or adhesively attached to the first and second ends 226, 228. Routing detection sensors may be mounted on multiple sides of the bridge strap 220. The strap 220 may be formed of steel or other suitable force bearing and potentially bendable material. The strap 220 may be formed of a flexible and bendable material that exhibits different amounts of bending, depending on seat belt routing.

Figure 14:
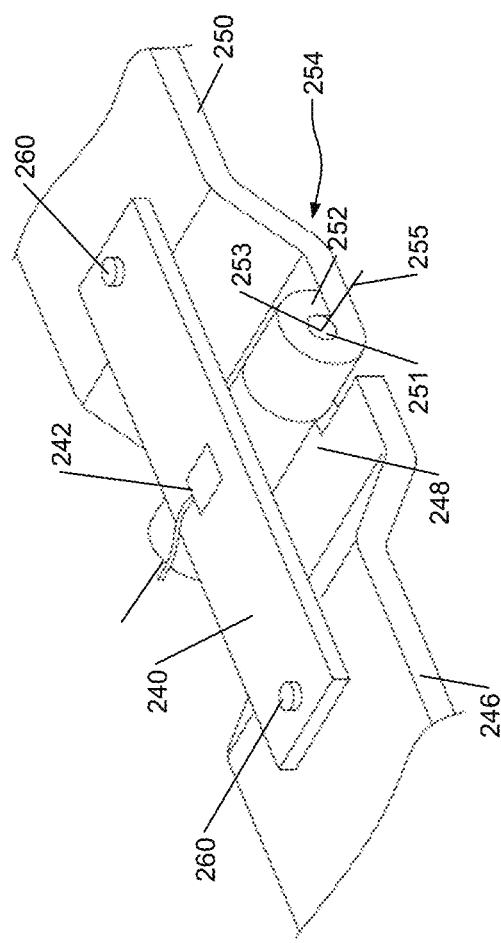
FIG. 14 is a perspective view of an example of a bridge strap for a seat belt routing detection sensor mounted on a hinged bracket of a seat belt buckle mounting assembly in accordance with an embodiment of the present disclosure.

FIG. 14 shows a bridge strap 240 for a routing detection sensor 242 mounted on hinged brackets of a seat belt buckle mounting assembly. FIG. 14 shows a modified version of the second bracket 180 of FIG. 10. The hinged brackets include (i) a first bracket 246 having a first end and a second end with a first hinge portion 248, (ii) a second bracket 250 having a first end and a second end with a second hinge portion 252, (iii) the bridge strap 240, and (iv) one or more routing detection sensors 242 and a hinge pin 251. The first hinge portion 248 and the second hinge portion 252 form a pivot 253 and rotate about a pivot axis 255. The brackets 246, 250 are bent twice to provide respective halves of an offset, similar to the offset of FIG. 13. The hinge portions 248, 252 when connected together provide a pivot. The hinges disclosed herein may include a hinge pin 251 about which the corresponding brackets, member, and/or components rotate about. The pivot is disposed in a center of an offset area 254. The bridge strap 240 provides a force bearing and potentially bendable joint and extends across the offset area 254 and hinge and attaches to the first end of the first bracket 246 and the second end of the second bracket 250 via, for example, fasteners 260 (e.g., rivets, threaded fastener, snap-in fasteners, etc.). The one or more routing detection sensors 242 are attached to the bridge strap 240 over the offset area 254. In one embodiment, the bridge strap 240 is welded to or adhesively attached to the first end of the first bracket 246 and the second end of the second bracket 250. Routing detection sensors may be mounted on multiple sides of the bridge strap 240. The strap 240 may be formed of steel or other suitable bendable material. The strap 240 may be formed of a flexible and bendable material that exhibits different amounts of bending, depending on seat belt routing.

Figure 15:
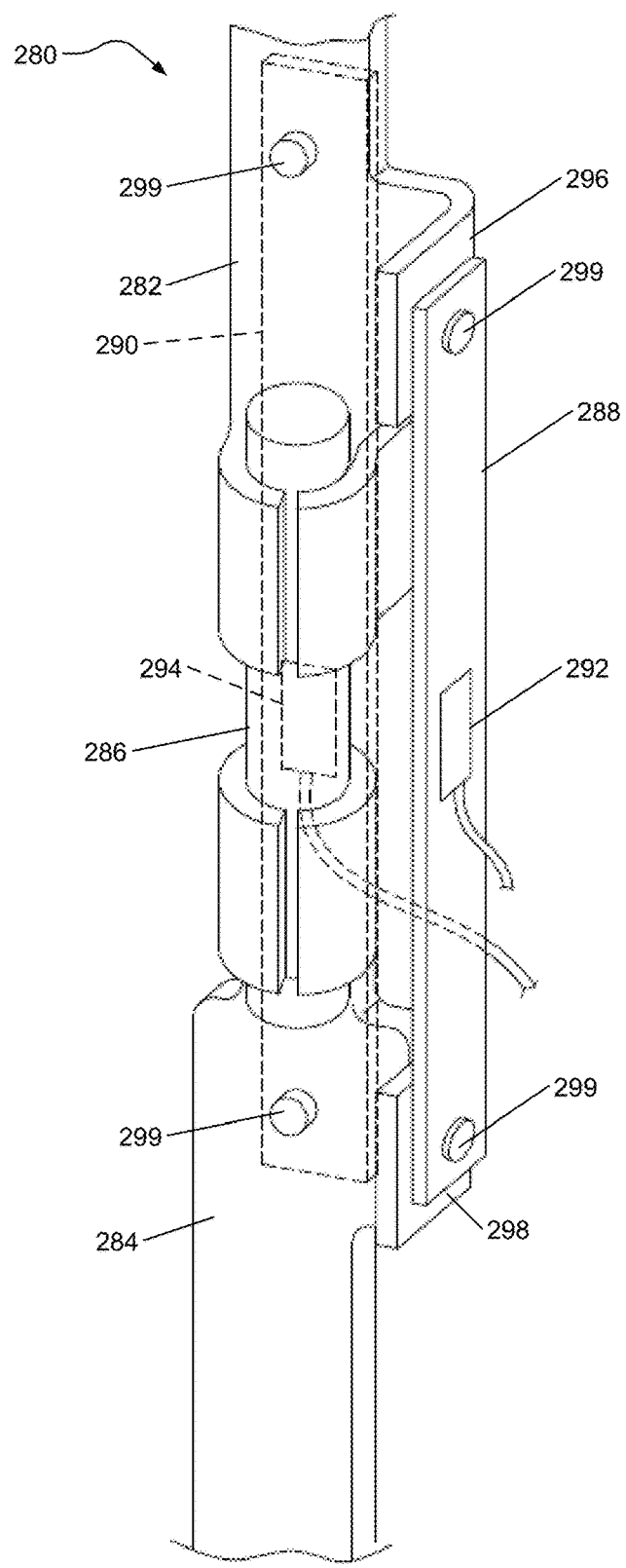
FIG. 15 is a perspective view of an example of a portion of a seat belt buckle mounting assembly including dual-sensor mounting straps in accordance with an embodiment of the present disclosure.

FIG. 15 shows a portion 280 of a seat belt buckle mounting assembly and may replace a portion of the seat belt buckle mounting assembly 172 of FIG. 10. The portion 280 includes a first bracket 282, a second bracket 284, a cable 286, a first strap 288, a second strap 290, and two or more routing detection sensors 292, 294. Each of the brackets 282, 284 is 'L'-shaped with one leg of each of the brackets 282, 284 bent at a 90° angle. Each of the brackets 282, 284 is crimped to the cable 286 at a first end. The cable 286 provides a gimbaled joint. Although the gimbaled joint is shown between the two brackets, the gimbaled joint may be included closer to and/or in a housing of a seat belt buckle (e.g., the seat belt buckle 182 of FIG. 10). Each of the straps 288, 290 is connected to the brackets 282, 284. The cable 286 could also be replaced with a ball in socket type of gimbaled joint. The first strap 288 is connected to be at a 90° angle relative to the second strap 290. The first strap 288 is attached to 90° angled extension members 296, 298 of the brackets 282, 284. The second strap 294 is connected to a first end of the first bracket 282 near the crimped end, which is connected to the cable 286. The second strap 290 is connected to the second bracket 284 near the crimped end, which is opposite an end that may be mounted to a floor, a seat, or frame of a vehicle.

The straps 288, 290 are attached to the brackets 282, 284 via, for example, fasteners 299 (e.g., rivets, threaded fastener, snap-in fasteners, etc.). The one or more routing detection sensors 292, 294 are attached to the straps 288, 290 between the fasteners 299. In one embodiment, the straps 288, 290 are welded to or adhesively attached to the brackets 282, 284. The routing detection sensors 292, 294 may be mounted on multiple sides of the straps 288, 290.

The first bracket 282, the second bracket 284, the cable 286, the first strap 288, and the second strap 290 may be formed of various materials. In one embodiment the first bracket 282, the second bracket 284, the cable 286, the first strap 288, and the second strap 290 are formed of steel and/or other suitable materials. The cable 286 may be formed of a flexible and bendable material that exhibits different amounts of bending, depending on seat belt routing.

Figure 16:
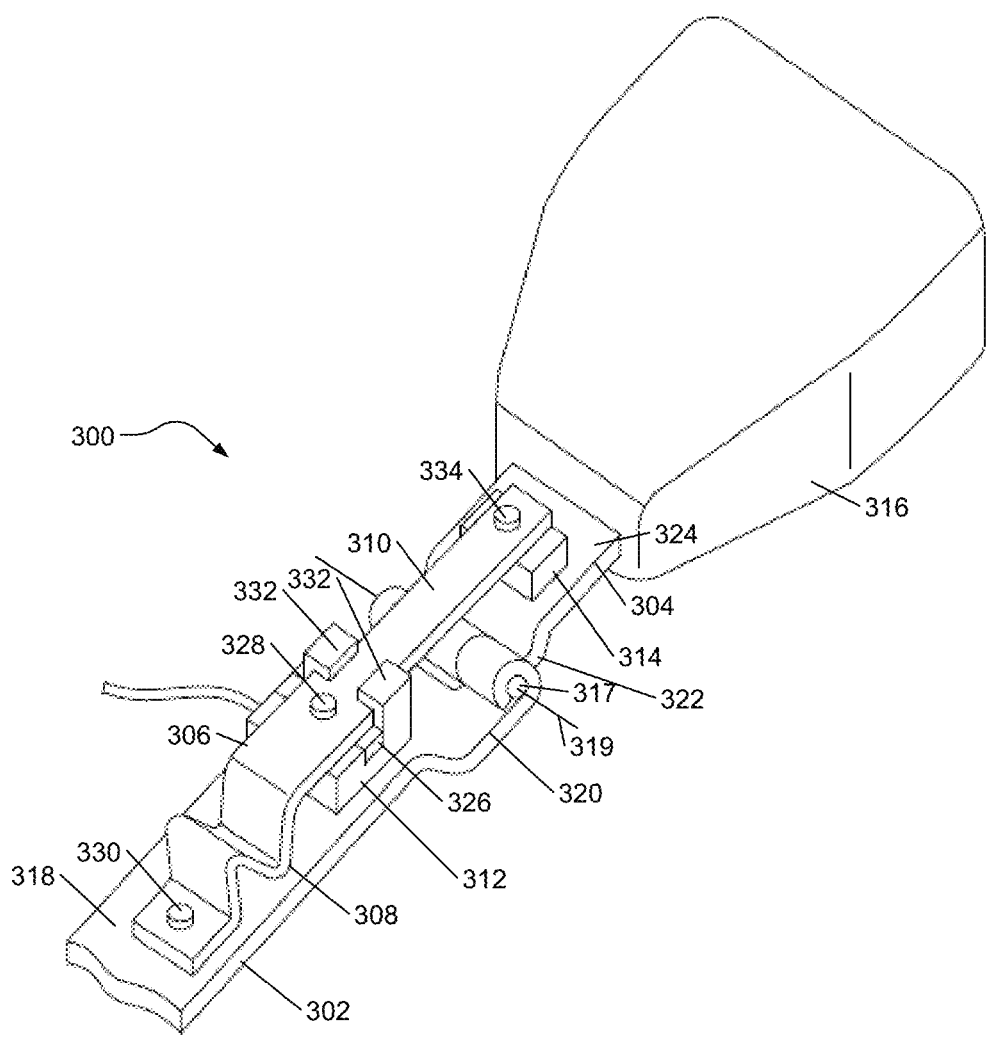
FIG. 16 is a perspective view of an example of a portion of a spring loaded and hinged single-axis seat belt routing sensing system in accordance with an embodiment of the present disclosure.

FIG. 16 shows a portion 300 of a spring loaded and hinged single-axis seat belt routing sensing system that may replace the seat belt routing sensing system 170 of FIG. 10. The portion 300 includes a first bracket 302, a second bracket 304, a strap 306 having a spring portion 308 and an elongated portion 310, a sensor holding block (or member) 312, a mounting block (or member) 314, and a seat belt buckle 316. The first bracket 302 and the second bracket 304 are configured similar to the brackets 246, 250 of FIG. 14 and have bent portions and hinge portions that connect to provide a pivot 317 with a pivot axis 319. A first end 318 of the first bracket 302 may be fastened to a floor, a seat, or a frame. A second end 320 of the first bracket 302 is connected to a first end 322 of the second bracket 304. A second end 324 of the second bracket 304 is connected to the seat belt buckle 316.

The sensor holding block 312 is attached to the first bracket 302 and may include a magnet sensor 326 (e.g., a Hall-effect sensor) disposed in a recess 328 of the sensor holding block 312 and disposed opposite a magnet 328. Other types of magnetic field sensors may also be used depending on packaging and cost requirements such as magneto-diode, magneto-transistor, AMR magnetometer, GMR magnetometer, magnetic tunnel junction magnetometer, magneto-optical sensor, Lorentz force based MEMS sensor, Electron Tunneling based MEMS sensor, MEMS compass, Nuclear precession magnetic field sensor, optically pumped magnetic field sensor, fluxgate magnetometer, search coil magnetic field sensor and SQUID magnetometer. The magnet 328 is attached to the strap 306. Bending (or movement) of the strap 306 moves the magnet 328 relative to the magnet sensor 326. For example, as the seat belt buckle 316 is rotated about the pivot axis 319 of the hinge, the magnet 328 moves relative to the magnet sensor 326 and affects output of the magnet sensor 326. The magnet 328 and the magnet sensor 326 may be replaced with a strain gauge or other sensor. A metal sensor based on principles of electromagnetic induction could also be used. In this case, a metal object or a hole may be substituted for the magnet 328 so that the sensor is configured to detect the presence of more metal or the absence of metal with respect to the surrounding structure adjacent this feature.

The strap 306 provides a bendable joint. A first end of the strap 306 is attached to the first end 318 of the first bracket 302 at a first attachment point 330. The spring portion 308 has a wave shape with several bends and is disposed between the first attachment point 330 and the sensor holding block 312. The sensor holding block 312 includes two tabs 332 that overlap and hold a center portion of the strap 306 and prevent the strap 306 from moving laterally relative to the first bracket 302. A second end of the strap 306 is attached to the rigid mounting block 314 at a second attachment point 334, which is attached to the second bracket 304 between the hinge and the seat belt buckle 316. The second bracket 304 may be shaped differently than shown, such that the mounting block 314 is not needed. In one embodiment, the strap 306 includes multiple separate elements, where the spring portion 308 is one of the elements.

Figure 17:
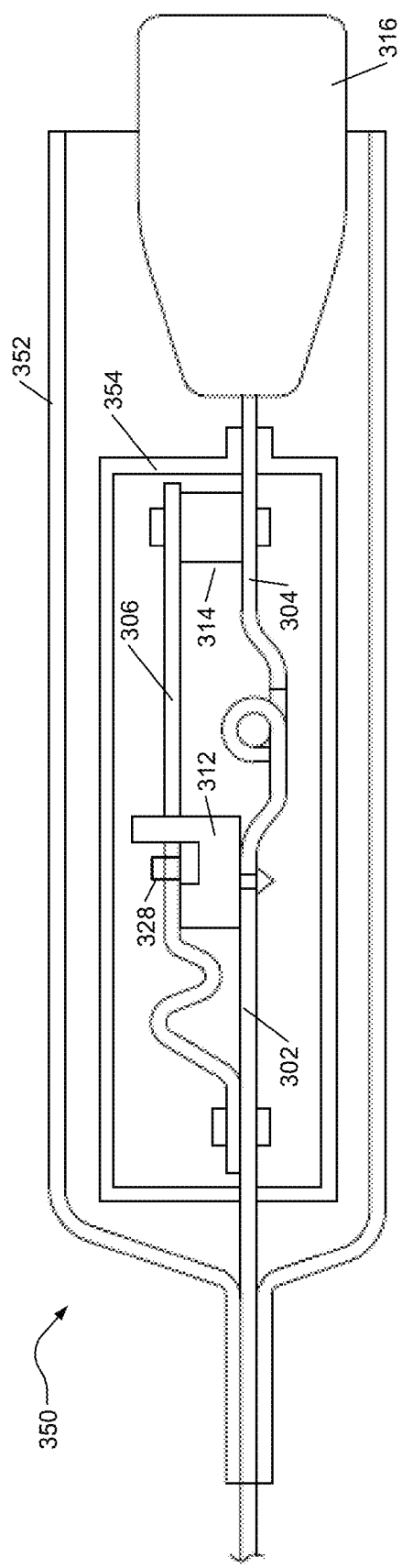
FIG. 17 is a side cross-sectional view of a portion of the spring loaded and hinged single-axis seat belt routing sensing system of FIG. 16.

The first bracket 302, the second bracket 304, the strap 306, the sensor holding block 312, and the mounting block 314 may be formed of various materials. In one embodiment, the first bracket 302, the second bracket 304, and the strap 306 are formed of steel and the sensor holding block 312 and the mounting block 314 are formed of plastic, however other materials may be used. As an example, the mounting block 314 may be formed of metal. In one embodiment, the shield 352 (as shown in FIG. 17) and the clamshell 354 (As shown in FIG. 17) are formed of plastic and/or other suitable materials. The strap 306 may be formed of a flexible and bendable material that exhibits different amounts of bending, depending on seat belt routing. The strap 306 having a spring portion 308 and an elongated portion 310, the sensor holding block 312, and the mounting block 314 may be oriented differently. For example, (i) the mounting block 312 and elongated portion 310 may be attached to the first bracket 302, and (ii) the spring portion 308 and sensor holding block 312 may be attached to the second bracket 304.

FIG. 17 shows a portion 350 of the spring loaded and hinged single axis seat belt routing sensing system of FIG. 16 including a shield 352 and an inner clamshell 354. The inner clamshell 354 may be configured similar to the clamshell 150 of FIGS. 9A and 9B, but may not include the center members 164, 166. The inner clamshell 354 covers portions or all of the brackets 302, 304, the strap 306, the sensor holding block 312, the magnet 328, the mounting block 314, and the hinge of the brackets 302, 304. The inner clamshell 354 may be made of flexible material and function as a boundary to prevent debris or liquids from contaminating the corresponding seat belt routing sensing system. The shield 352 covers a portion of the first bracket 302 not covered by the shield 352, the inner clamshell 354, and a portion of the seat belt buckle 316. The shield 352 may be used for a similar purpose as the shield 352 of FIGS. 8A and 8B and may be attached to the first bracket 302.

Figure 18:
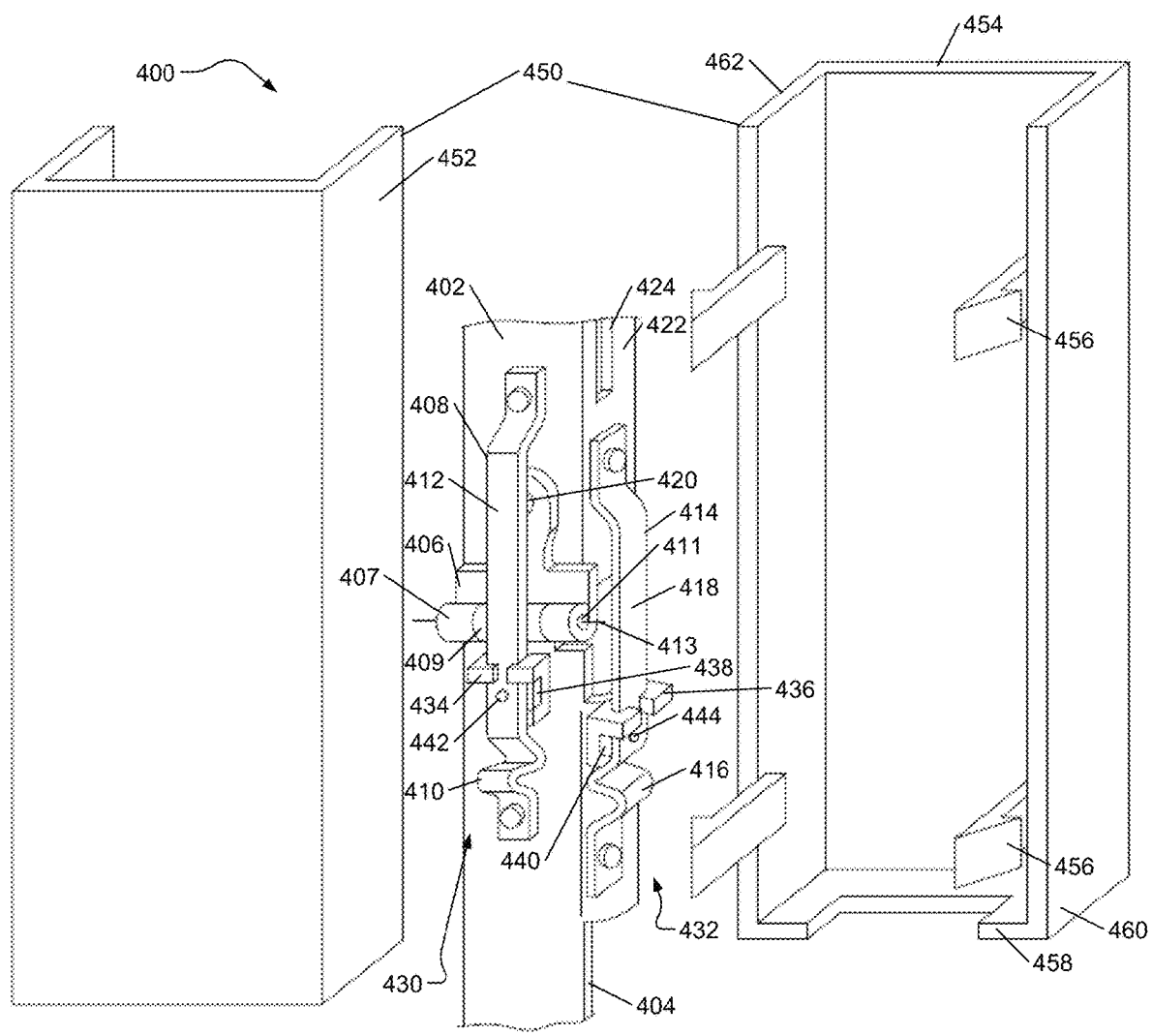
FIG. 18 is a perspective view of an example of a portion of a spring loaded and hinged dual-axis seat belt routing sensing system in accordance with an embodiment of the present disclosure.

FIG. 18 shows a portion 400 of a spring loaded and hinged dual axis seat belt routing sensing system that includes a first bracket (or 'U'-shaped bracket) 402, a second bracket (or 'U'-shaped bracket) 404, a hinge pivot bracket 406, a first strap 408 having a spring portion 410 and an elongated portion 412, a second strap 414 including a spring portion 416 and an elongated portion 418. The first bracket 402 is attached to the hinge pivot bracket 406 at a pivot via a fastener 420 (e.g., a rivet, or fastener having a shaft) to allow the first bracket 402 to rotate in a first angular direction relative to the hinge pivot bracket 406, where the first angular direction is associated with a first plane. The first bracket 402 is attached to the second bracket 404 via the hinge pivot bracket 406. The hinge pivot bracket 406 includes a first portion 407 of a hinge that is attached to a second portion 409 of the hinge. The portions 407, 409 provide a pivot 411 and rotate about a pivot axis 413. The second portion 409 of the hinge is an integrated part of the second bracket 404 and allows the first bracket 402 and the hinge pivot bracket 406 to rotate in a second angular direction relative to the second bracket 404, where the second angular direction is in a second plane. The second plane is perpendicular to the first plane.

The internal latching mechanism of a seat belt buckle (e.g., the seat belt buckle 182 of FIG. 10) may be directly or indirectly attached to a slotted end 422 of the first bracket 402 away from the hinge. In one embodiment, a portion of the seat belt buckle is disposed in slots 424. In another embodiment, an intermediate bracket or connector connects a portion of the seat belt buckle to the first bracket 402.

The portion 400 includes two sensing systems 430, 432, which are similar to the single axis sensing system of FIG. 16. The first sensing system 430 is attached on first sides of the brackets 402, 404 and used to detect bending moment, force, angular position, angular movement and/or other seat belt routing status indicative parameter in a first angular direction associated with a first plane. The second sensing system 432 is attached to second sides of the brackets 402, 404 and used to detect bending moment, force, angular position, angular movement and/or other seat belt routing status indicative parameter in a second angular direction associated with a second plane. The first plane may or may not be perpendicular to the second plane.

The seat belt routing sensing systems 430, 432 include the straps 408, 414, sensor holding blocks 434, 436, magnet sensors 438, 440 (e.g., Hall-effect sensors, other sensors disclosed herein for the example of FIG. 16, or other suitable sensors), and magnets 442, 444 and may include mounting blocks (e.g., the mounting block 314 of FIG. 16). The straps 408, 414 provide bendable joints. The spring portions 410, 416 are attached to the second bracket 404. The elongated portions 412, 418 are attached to the first bracket 402. The sensor holding blocks 434, 436 are attached to the second bracket 404 and hold the magnet sensors 438, 440 and center portions of the straps 408, 414. The magnets 442, 444 and magnet sensors 438, 440 may be replaced with strain gauges or other sensors.

A seatbelt buckle cover or shield 450 may be attached to and cover a portion or all of the spring loaded and hinged dual-axis seat belt routing sensing system. The shield 450 includes two halves 452, 454. The first half 452 includes attachment members (not shown) that extend inward and the second half 454 includes tabs 456 that extend from the second half 454 and are inserted in the attachment members. The shield 450 when in a closed state includes two large openings at each end to allow ends of the second bracket 404 and a seat belt buckle to extend out of and move within and relative to the shield 450. The shield 450 may have a cross member 458 at a first end 460 and may not have a cross member at a second end 462. This provides a larger opening at the second end 462 for the seat belt buckle mechanism and a smaller opening at the first end 460 for the second bracket 404. The shield 450 may partially cover the seat belt buckle.

The components of the portion 400 may be formed of similar materials as the components of the portion 300 of FIG. 16. Similarly, the shield 450 is formed of plastic and/or other suitable material. The straps 408, 414 may be formed of a flexible and bendable material that exhibits different amounts of bending, depending on seat belt routing.

The straps 408, 414 having spring portions 410, 416 and elongated portions 412, 418, the sensor holding blocks 434, 436, and the mounting blocks 434, 436 may be oriented differently than shown. For example, the mounting blocks 434, 436 and elongated portions 412, 418 may be attached to the second bracket 404 and the spring portions 410, 416 and sensor holding blocks 434, 436 may be attached to the first bracket 402. Additional straps, sensor holding blocks, sensors and mounting blocks may be used that sense along corresponding planes and may be positioned opposite the straps, sensor holding blocks, sensors and mounting blocks shown in FIG. 18.

Figure 19:
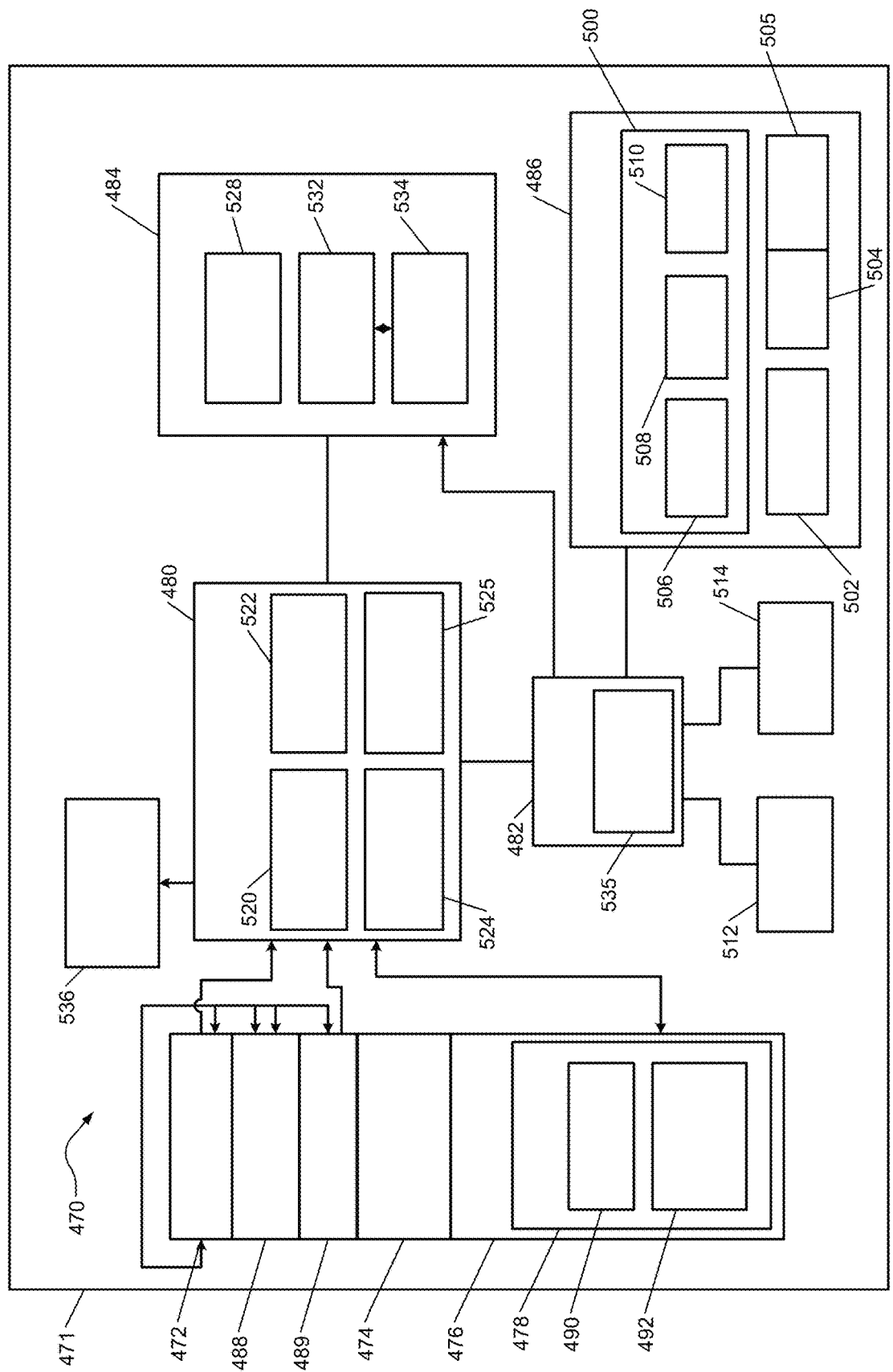
FIG. 19 is a functional block diagram of an example of a vehicle system in accordance with an embodiment of the present disclosure.

FIG. 19 shows a vehicle system 470 of a vehicle 471 that includes occupant sensors 472, seat belt assemblies 474, seat belt sensor circuits 476 with seat belt sensors 478, a seat belt module 480, other vehicle control modules 482, a memory 484 and a propulsion system 486. The occupant sensors 472 and seat belt assemblies 474 may be attached to or located relative to seats 488 of the vehicle 471 and include strain gauges, weight sensors, contact sensors, cameras, position sensors, etc. for detecting, for example, presence, weight, location, height, size, and/or seated position of vehicle occupants. The seat position sensors 489 may be attached to or located relative to the seats 488 of the vehicle 471 and include various position sensors that monitor: positions of the seats 488 on seat tracks; heights of the seats 488 relative to the seat tracks; seatback angles relative to bottoms of the seats 488 and seat bottom angle. Seat position sensors 489 external to the seats 488 may be used such as cameras. The seat belt assemblies 474 may include seat belt webbing, seat belt retractors, guide loops, pretensioners, energy absorption mechanisms, seat belt buckle mounting assemblies, etc.

In one embodiment, sizes or weights of vehicle occupants are determined, which are used by the seat belt module 480 to determine proper routing of seat belts and/or thresholds for determining whether seat belts are routed correctly. This may include, for example, determining and/or adjusting thresholds based on the detected weights, optionally detected seat positions, and then determining whether the seat belts are worn properly. As described herein, outputs of routing detection sensors and/or seat belt sensor circuits may be compared to thresholds to determine whether seat belts are properly worn. In another embodiment, mass and vibration patterns and/or harmonics are monitored. This may include determining and monitoring mass and vibration patterns and/or harmonics based on outputs of the occupant sensors 472 and/or the routing detection sensors 492 to determine whether a seat belt is buckled and/or worn properly. The occupant sensors 472 and/or the routing detection sensors 492 may experience different mass and vibration patterns and/or harmonics when the seat belt is unbuckled versus when the seat belt is buckled and properly worn. For example, a seat belt buckle may have the added mass of the latch plate 70 of FIG. 4 when the latch plate 70 is buckled into the seat belt buckle. The determined mass and vibration patterns and/or harmonics may be compared to predetermined and stored mass and vibration patterns and/or harmonics to determine the current state of the seat belt. This information may also be used in combination with the force, moment, angle measurements from the routing detection sensors to determine the current state of the seat belt. In this manner, both the routing status and whether the seat belt is buckled may be detected. When the seat belt module 480 is able to determine based on the comparison whether the seat belt is buckled, the latch plate sensors 490 may be eliminated.

The seat belt sensor circuits 476 may include Wheatstone bridge circuits and/or other circuits and the seat belt sensors 478. In one embodiment, the seat belt sensor circuits 476 provide output signals to the seat belt module 480 that are indicative of routing states of seat belts. In another embodiment, the seat belt sensor circuits 476 include logic to determine whether seat belts are worn properly and indicate to the seat belt module 480 whether the seat belts are worn properly. This may include directly or indirectly monitoring outputs of the occupant sensors 472, the latch plate sensors 490, the seat position sensors 489 and/or the routing detection sensors 492. In one embodiment, the routing detection sensors 492 are used to determine whether the seat belts are buckled via latch plates instead of latch plate sensors 490. Thus, the latch plate sensors may not be included. In another embodiment, latch plate sensors are located within respective seat belt buckles and used to determine whether seat belts are buckled.

The seat belt sensors 478 may include seat belt buckle latch plate sensors 490 and routing detection sensors 492. Examples of the routing detection sensors 492 are described above with respect to FIGS. 1-3 and 8-18. The seat belt module 480 performs operations based on outputs of the occupant sensors 472, the seat belt sensors 478, the seat position sensors 489 and the seat belt sensor circuits 476. The propulsion system 486 may include an engine 500, a transmission 502, and one or more electric motor(s) 504. The engine 500 may include a throttle system 506, an ignition system 508 and a fuel system 510. The motor(s) 504 may be connected to a battery system 505.

The seat belt module 480 may signal the other vehicle control modules 482 based on the outputs of the sensors 472, 478, 489 to prevent or limit certain vehicle operations. The other vehicle control modules 482 may include, for example, an engine control module, a transmission control module, an electric motor (or hybrid) control module, and/or other modules that control operation of vehicle components and/or devices. For example, if a vehicle occupant is not properly wearing a seat belt, the seat belt module 480 may warn the occupant via the occupant warning module 535, and then if the warning isn't heeded by the occupant, prevent the vehicle 471 from moving, permit the vehicle 471 to move to a nearby safe location and then prevent the vehicle 471 from moving until the seat belt is properly worn, and/or limit certain operations. For example, the seat belt module 480 may limit speed of the vehicle 471 to below a predetermined speed or limit how far a vehicle 471 is permitted to travel from a current location. As another example, the seat belt module 480 may prevent the vehicle 471 from traveling in certain directions.

The seat belt module 480 may signal the other vehicle control modules 482 to prevent the vehicle 471, the engine 500, and/or the motors 504 from turning on, starting and/or running. The turning on and/or starting of the vehicle 471 may include the powering on of electronic components and/or the starting of a propulsion system 486. The starting of the propulsion system 486 may include starting an engine 500 and/or one or more electric motors 504. This may include enabling operation of the transmission 502, the throttle system 506, the ignition system 508, and/or the fuel system 510.

The vehicle system 470 further includes an occupant warning module 535, which may be one of the vehicle control modules 482. The occupant warning module 535 controls one or more displays and speakers; a single display 512 and a single speaker 514 are shown. Each of the displays may be, for example: in-dash display; a heads up display; a display mounted in a headliner, a headrest, or a seatback; or other vehicular display. The displays, speakers and/or other visual, haptical, and/or audio devices are used to provide warnings and/or other alert messages to vehicle occupants. These warnings would likely be given prior to taking other vehicle actions and if the occupant doesn't heed the warnings.

The seat belt module 480 may include an occupant monitoring module 520, a buckle module 522, a seat belt routing module 524 and a seat position monitoring module 525. Operations of these modules are described below with respect to the method of FIG. 20. The memory 484 may store threshold levels 528, graphs 532, and/or look-up tables 534, which may be used in determining whether to perform, for example, the operations of the method of FIG. 20. Examples of the graphs 532 are shown in FIGS. 21-24.

The vehicle system 470 may include a transceiver 536 for wirelessly transmitting routing states of occupants, seating locations, seat belts, images from cameras within the vehicle 471 (e.g., occupant sensor cameras used to monitor vehicle occupants), periods and/or durations seat belts are improperly worn and/or other related information to a central office (not shown). The seat belt module 480 may track this information, store the information in the memory 484 and report the information to a central office. The central office may review the information and provide commands and/or warning information back to the seat belt module 480 or the vehicle occupant(s). The commands may include operations to be performed by the vehicle system 470. The warning signals may be indicated visually, haptically, or audibly via the display, 512, the speaker 514, and/or other devices of the vehicle system 470.

Figure 20:
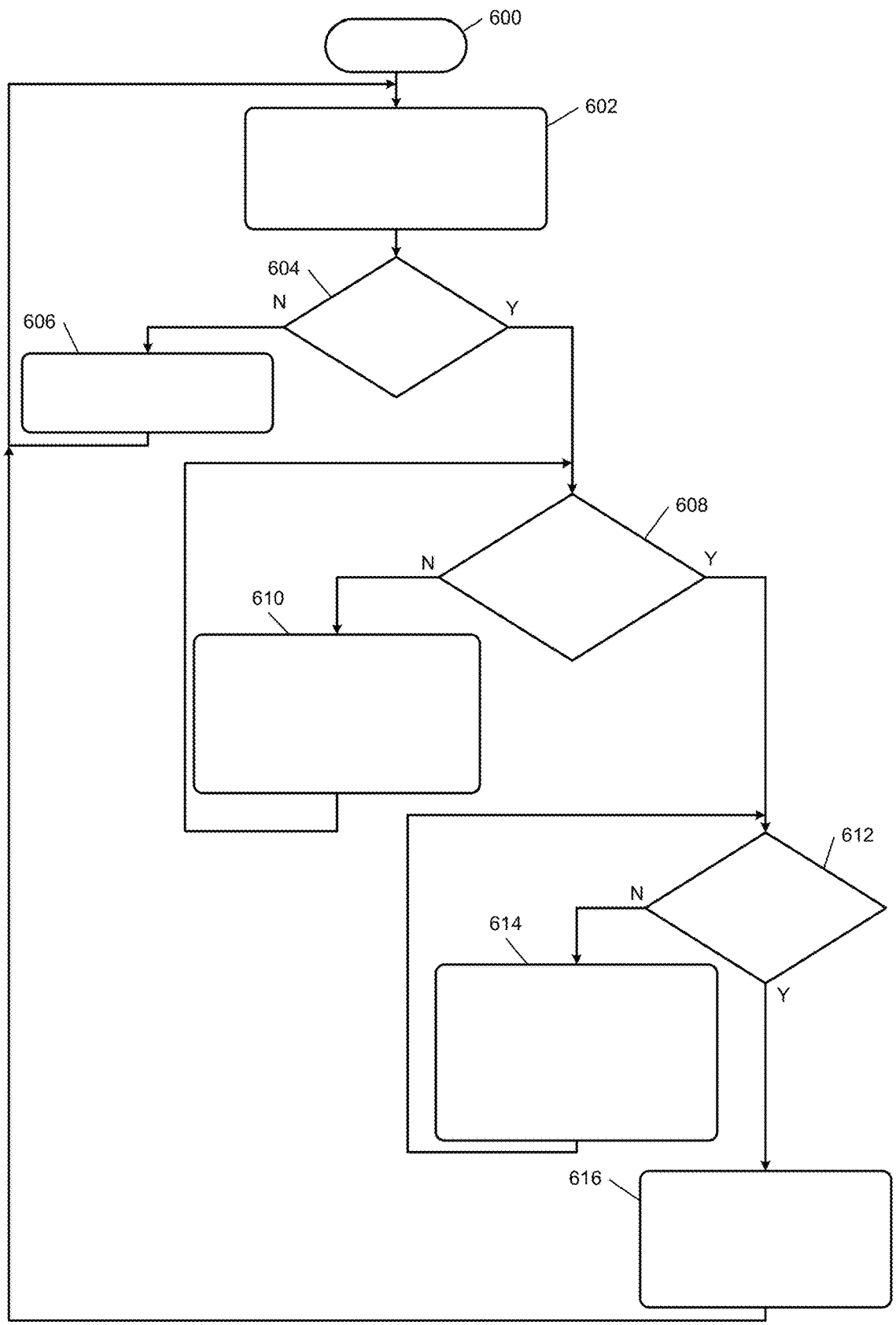
FIG. 20 illustrates an example method of operating a vehicle system based on seat belt routing and in accordance with an embodiment of the present disclosure.

The vehicle systems disclosed herein may be operated using numerous methods, an example method is illustrated in FIG. 20. In FIG. 20, a method of operating a vehicle system based on seat belt routing is shown. Although the following operations are primarily described with respect to the implementations of FIGS. 8A-19, the operations may be easily modified to apply to other implementations of the present disclosure. The operations may be iteratively performed.

The method may begin at 600. At 602, the modules 480, 520, 522, and/or 524 receive signals from and monitor outputs of the sensors 472, 478, 489, 490, 492 and/or the seat belt sensor circuits 476. This may include supplying input signals to one or more Wheatstone bridge circuits and monitoring outputs of the one or more Wheatstone bridge circuits.

At 604, the occupant monitoring module 520 determines whether one or more vehicle occupants are present in the corresponding vehicle. The vehicle may be a personal vehicle, a vehicle having an internal combustion engine, a hybrid vehicle, an electric vehicle, an autonomous vehicle, etc. This may include determining which seats the one or more vehicle occupants are sitting on. As an optional enhancement, occupant size may be part of the decision, where (i) a larger sized occupant is treated as an occupant present in a seat, and (ii) a child in a child restraint, which may be attached to the vehicle with latch seat attachments, is treated as an occupant not present in the seat. If vehicle occupants are not present in the vehicle, operation 606 may be performed, otherwise operation 608 may be performed.

At 606, the seat belt module 480 permits the vehicle to move to an intended destination (e.g., a destination selected by a vehicle occupant). This may include the seat belt module 480 signaling one or more of the other vehicle control modules 482 to enable operation and/or turning on of an engine, a transmission, a motor, etc. or a portion thereof.

At 608, the buckle module 522 may determine whether seat belts of the vehicle occupants are buckled based on, for example, outputs of the latch plate sensors 490, outputs of routing detection sensors 492, or one of these types of sensors. If one or more of the seat belts are not buckled, then operation 610 is performed, otherwise operation 612 is performed. The determination of whether a seat belt is buckled may be based on one or more of mass, capacitance, vibration pattern and harmonics, which is based on outputs of the occupant sensors 472, the latch plate sensors 490, and/or the routing detection sensors 492. The mass, capacitance, vibration pattern and harmonics may be compared to mass and vibration patterns and/or harmonics stored in the memory 484.

At 610, the buckle module 522 may: generate a visual, haptical, and/or audible warning signal via the display 512, the speaker 514 and/or other warning device of the vehicle system 470 indicating that one or more seat belts are not buckled, prevent the vehicle from moving; generate a visual, haptical, and/or audible warning signal via the display 512, the speaker 514 and/or other warning device of the vehicle system 470 indicating that the vehicle is moving; and/or signal the other vehicle control modules 482 to move the vehicle to a nearby location that is a low risk for an accident. The low risk location may not be the intended destination. As an example, the vehicle may pull off to a side of a road, pull into a parking lot, pull into a driveway, or move to another safe location. This may include limiting certain vehicle operations, such as limiting vehicle speed, directions of travel, etc. Operation 602 may be performed subsequent to operation 610.

At 612, the seat belt routing module 524 determines whether the seat belts of the vehicle occupants are properly worn. This may be determined continuously, when the vehicle is stopped, while the vehicle is moving, at periodic or random moments in time, etc. This may include comparing output values of one or more of the seat belt sensor circuits 476, the seat position sensors 489 and the routing detection sensors 492 with predetermined ranges and/or comparing the output values to the threshold values 528, values of the graphs 532, and/or values in the look-up tables 534. The threshold values 528 may include bending moment threshold values, force threshold values, angular position threshold values, and/or movement threshold values, and/or other threshold values corresponding to the one or more parameters detected by or determined based on outputs of the routing detection sensors 492. The threshold values 528 may be modified based on seat position sensor 489 input and occupant sensor input 472 as different positions of the seats 488, and different sizes of the occupants may be used to adjust the thresholds to better match the seat and occupant condition. In an embodiment, the determination of whether a seat belt is worn properly is based on a determined mass and vibration pattern and/or harmonics detected via the routing detection sensors 492 and/or seat belt sensor circuits 476, which may be compared to predetermined mass and vibration patterns and/or harmonics stored in the memory 484 and associated with corresponding seat belt routing states.

Figure 21:
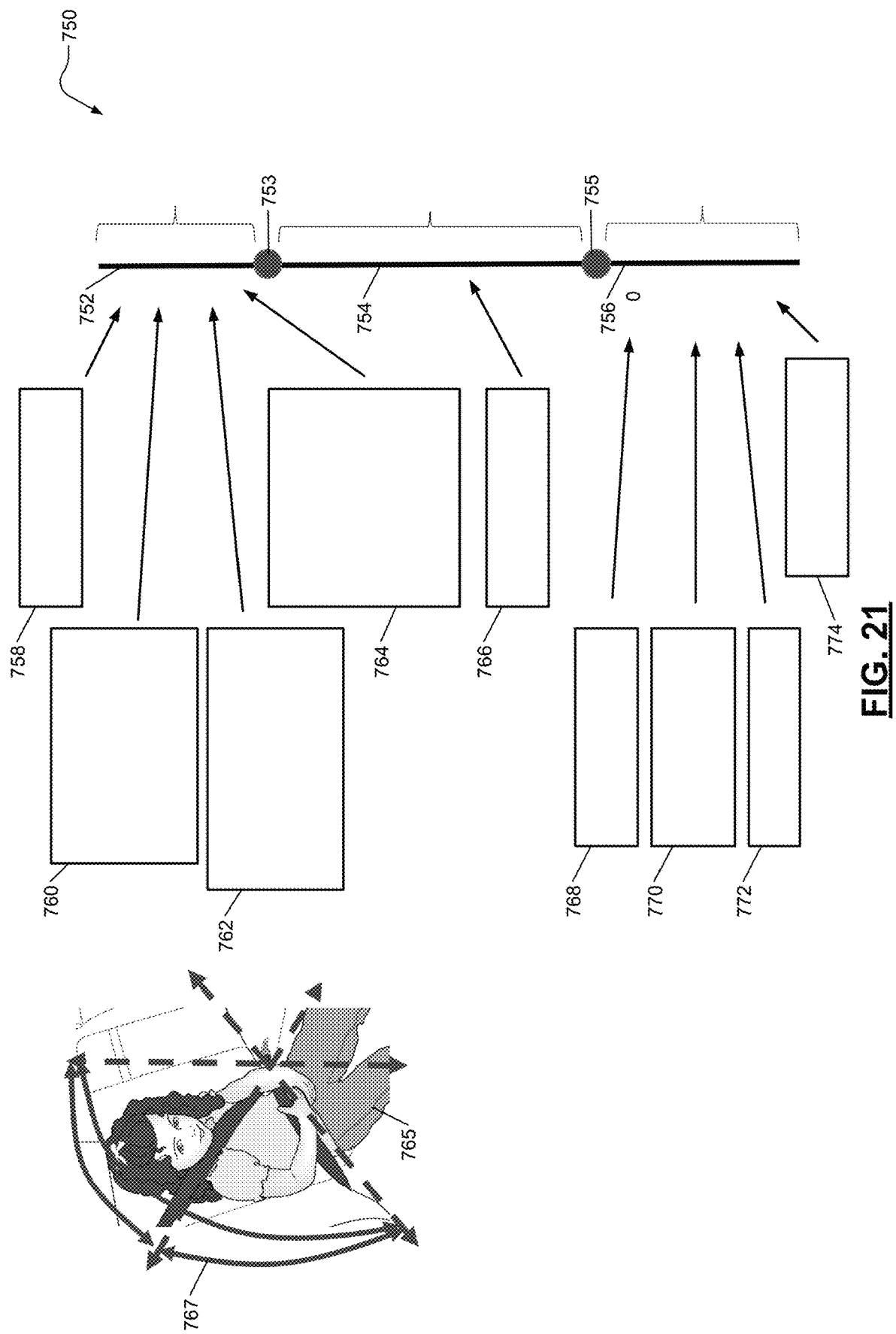
FIG. 21 is a perspective view of a vehicle occupant illustrating an example of a detection sensitivity zone for a single seat belt routing detection sensor and an example corresponding seat belt routing graph used to determine whether a seat belt is worn properly in accordance with an embodiment of the present disclosure.

As a first example, the routing detection sensor outputs and/or seat belt sensor circuit outputs may be compared to values of the graph 750 of FIG. 21 when determining whether seat belts are worn properly. The graph 750 includes a first seat belt improperly or not worn range 752, a seat belt properly worn range 754, and a second seat belt improperly or not worn range 756. The ranges 752, 754, 756 may be separated by threshold sets represented by points 753, 755. Each of the ranges 752, 754, 756 and each of the threshold sets 753, 755 may have corresponding bending moment ranges and thresholds, force ranges and thresholds, angular position ranges and thresholds, angular movement ranges and thresholds, and/or other parameter ranges and thresholds. In one embodiment, the graph 750 includes possible values for an output of a single routing detection sensor of a single axis seat belt routing detection system.

The first seat belt improperly or not worn range 752 may be associated with, for example first improperly routed seat belt states including: a seat belt buckled and routed behind a seat designated by box 758; a seat belt buckled and routed between seat and vehicle occupant body (e.g., occupant sitting on lap belt and the shoulder belt routed behind the occupant's back) designated by box 760; a seat belt buckled and a lap belt routed between seat and vehicle occupant with the shoulder belt over the chest (e.g., occupant sitting on lap belt) designated by box 762; and a seat belt buckled and a shoulder belt routed between seat and vehicle occupant (e.g., occupant wearing lap belt correctly, but the shoulder belt routed behind the occupant's back) designated by box 764. The first seat belt improperly worn range 752 may include corresponding bending moment values, force values, angular position values, angular movement values, etc. associated with an improperly worn seat belt. Each of the seat belt improperly worn states associated with boxes 758, 760, 762, 764 may have corresponding routing detection sensor outputs and/or seat belt sensor circuit outputs in the first seat belt improperly or not worn range 752.

The seat belt properly worn range 754 refers to parameter values associated with when a seat belt is worn properly with the shoulder belt and lap belt over the occupant. FIG. 21 shows a vehicle occupant 765 illustrating an example sensor detection sensitivity zone 767 for a single routing detection sensor. The seat belt properly worn range 754 may include corresponding bending moment values, force values, angular position values, angular movement values, and/or other parameter ranges and thresholds associated with a properly worn seat belt. Each of the seat belt properly worn states associated with box 766 may have corresponding routing sensor outputs and/or seat belt sensor circuit outputs in the seat belt properly worn range 752.

The second seat belt improperly or not worn range 756 may be associated with, for example second improperly routed seat belt states, which may include one or more of the first improperly worn seat belt states associated with boxes 758, 760, 762, 764. The second improperly worn seat belt states may include: a fake latch plate inserted in a seat belt buckle instead of a latch plate designated for the seat belt buckle represented by box 768; a seat belt buckle latch plate buckled in a wrong seat belt buckle represented by box 770; a seat belt unbuckled represented by box 772; a seat belt buckled and routed behind a seat represented by box 774. Latch plate sensors 490 may be eliminated, when the seat belt unbuckled 772 state is detected based on other sensor data. The second seat belt improperly worn range 756 may include corresponding bending moment values, force values, angular position values, angular movement values, etc. associated with an improperly or not worn seat belt. Each of the seat belt improperly worn states associated with boxes 768, 770, 772, 774 may have corresponding routing detection sensor outputs and/or seat belt sensor circuit outputs in the second seat belt improperly or not worn range 756. As an alternative, a simpler version of this system could have threshold 753 and ranges 752, 754 without threshold 755 and range 756.

As yet another example, the routing detection sensor outputs and/or seat belt sensor circuit outputs may be compared to values of the graph 800 of FIG. 22 when determining whether seat belts are worn properly. The graph 800 includes multiple example sets of ranges, illustrating that the boundaries (or threshold curves) between the ranges may take on different shapes. The threshold curves have corresponding threshold values. The ranges have corresponding parameter values similar to the ranges of FIG. 21. The first set is provided by lines A1, A2. The second set is provided by lines B1, B2. The third set is provided by lines C1, C2. The fourth set is provided by lines D1, D2. For each of the sets, two ranges are provided for values associated with improperly or not worn seat belts and a single middle range for values associated with properly worn seat belts. In one embodiment, each axis of the graph 800 includes possible values for an output of a respective one of two routing detection sensors of a dual-axis seat belt routing detection system. FIG. 22 also shows a vehicle occupant 790 illustrating an example detection sensitivity zone 792 using two routing detection sensors. As an alternative, a simpler version of this system could have thresholds A2, B2, C2 and D2 without thresholds A1, B1, C1, D1.

Figure 23:
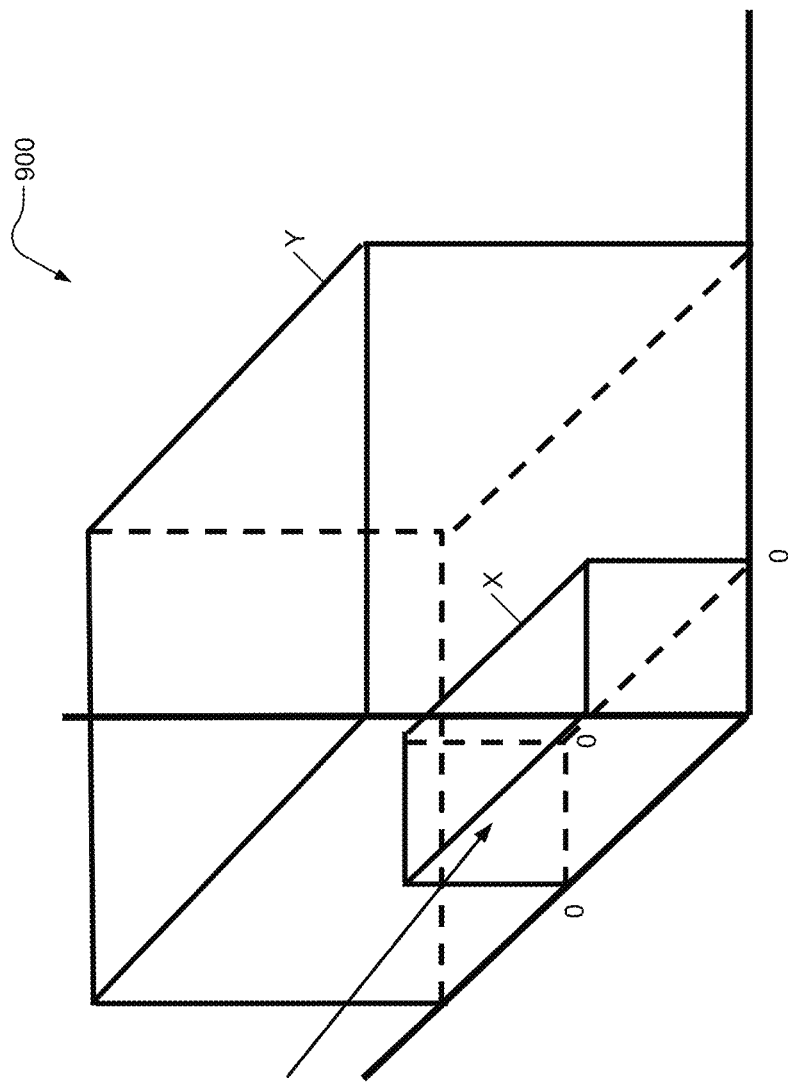
FIG. 23 is an example seat belt routing graph used for a three axis seat belt routing detection system to determine whether a seat belt is worn properly in accordance with an embodiment of the present disclosure.

As yet another example, the routing detection sensor outputs and/or seat belt sensor circuit outputs may be compared to values of the graph 900 of FIG. 23 when determining whether seat belts are worn properly. The graph 900 includes an example set of ranges. Two seat belt improperly or not worn ranges and a single middle seat belt properly worn range are shown separated by threshold boundaries represented by rectangular prisms X, Y. The threshold boundaries may take on different shapes. In one embodiment, each axis of the graph 900 includes possible values for an output of a respective one of three routing detection sensors of a three axis seat belt routing detection system. The seat belt improperly or not worn ranges may be associated with the same seat belt improperly worn states referred to above with respect to FIGS. 21, 22. Likewise, the seat belt properly worn range may be associated with the same seat belt properly worn state referred to above with respect to FIGS. 21, 22. As an alternative, a simpler version of this system could have the threshold represented by prism y without the threshold represented by prism X.

Although a certain number of ranges are shown in FIGS. 21-23, any number of improperly worn seat belt ranges and properly worn seat belt ranges may be predetermined and used. Also, the ranges and the sensitivity zones may be shifted based on sensor orientations. For FIGS. 22-23 differences in sensing directions may be 90° or other degree, depending on sensor orientation and actuation. Multiple routing detection sensors of similar or different sensing technology types may be used for a same sensitivity zone and/or may be mounted in a same orientation. In addition, although certain seat belt states are associated with a same range, each seat belt state may have a respective one or more ranges (such as based on sensor technology type) and based on these ranges, the seat belt module 480 of FIG. 19 may identify seat belts/seat belt buckles in these states and indicate these states to vehicle occupants and/or store these states in the memory 484.

Although certain seat belt routing states are described above with respect to FIGS. 21-23, other seat belt routing states may also be similarly detected. For example, a seat belt that is routed under a shoulder and around a stomach area (or torso) of a vehicle occupant may be detected as an improperly worn seat belt. As another example, a shoulder belt that is not routed over a shoulder or is routed on a wrong side of a vehicle occupant's head may also be detected as an improperly worn seat belt.

The thresholds and ranges of FIGS. 21-23 may be modified based on input on occupant size and seat location. Measurements from occupant sensors 472 and seat position sensors 489 may be used to provide correction factors for the thresholds and ranges since different size occupants and different seat positions may create different force, angle, moment on the seat belt buckle.

Figure 24:
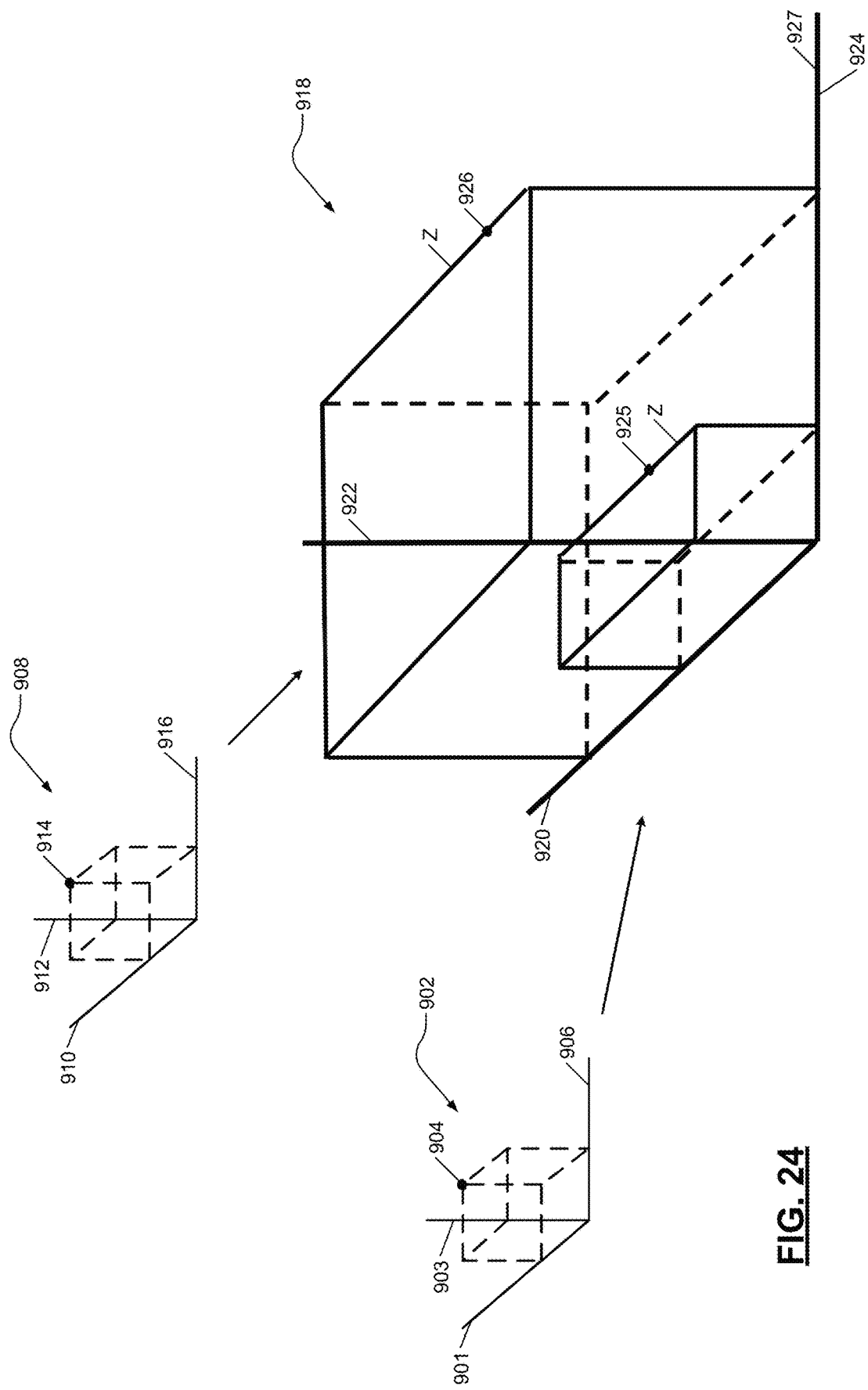
FIG. 24 is an example showing a resulting seat belt routing sensor correction factor based on seat position and occupant size inputs.

The graph 902 on the left portion of FIG. 24 shows the mapping for a seat location where seat horizontal position 901 and seat vertical position 903 measurements are made. The individual measurements produces a point 904 on this graph, which may be used to produce a composite seat position 906 that may be used for instance as a general seat position sensor input to graph 918 on the right portion of FIG. 24. The number of axes in the left portion of FIG. 24 is one more than the number of seat position measurements available. For example, if two measurements are available then three axes are shown in the left portion of FIG. 24 with two of the axes being for the measurements and one axis being for the resulting composite seat position 906. As yet another example, seat back angle and seat bottom angle may be included along with seat horizontal position and seat vertical position. This would result in a 5 axis space with the fifth axis being for the resulting composite seat position 906.

A similar graph 908 at the top portion of FIG. 24 shows the mapping for occupant size where occupant width 910 and occupant height 910 are measured. The individual measurements produces a point 914 on this graph, which may be used to produce a composite occupant size 916 that may be used for example as a general occupant size input to the graph 918 on the right portion of FIG. 24. The number of axes in the left portion of FIG. 24 is one more than the number of seat position measurements available. As with graph 902, the number of measurements and corresponding axes on graph 918 may be different depending on the number of measurements available.

The right portion of FIG. 24 shows an example of how seat position sensor input 920 and occupant size input 922 can affect the resulting seatbelt routing sensor threshold correction factor 924. The seat position sensor input 920 may be the composite seat position 906 or a specific input from a specific seat position sensor. The occupant size input 922 may be the composite occupant size 916 or a specific input from a specific occupant sensor. The graph 918 shows how seat belt routing sensor threshold correction factors represented by rectangular prisms Z can change based on seat position sensor input 920 and occupant size input 922. These inputs produce points 925, 926 on prisms Z. The corresponding resulting seatbelt routing sensor correction factors 924 may then be determined based on the mapping of points 925, 926 to the routing sensor correction factor axis 927. The surfaces represented by prisms Z may be different shapes. The resulting seatbelt routing sensor correction factors 924 may be used to adjust the thresholds and ranges shown and described for FIGS. 21-23 such as changing the magnitude of the thresholds and the associated ranges by multiplying the baseline thresholds by the correction factors.

If only seat position sensor input or occupant size input is used, then a two dimensional space would result for graph 918.

At 614, the routing module 524 may: generate a visual, haptical, and/or audible warning signal via the display 512, the speaker 514 and/or other warning device of the vehicle system 470 indicating that one or more seat belts are not worn properly, prevent the vehicle from moving; generate a visual, haptical, and/or audible warning signal via the display 512, the speaker 514 and/or other warning device of the vehicle system 470 indicating that the vehicle is moving; and/or signal the other vehicle control modules 482 to move the vehicle to a nearby location that is a low risk for an accident. This may include limiting certain vehicle operations, such as limiting vehicle speed, directions of travel, etc. Operation 602 may be performed subsequent to operation 614.

At 616, the routing module 524 may: generate a visual, haptical, and/or audible signal via the display 512, the speaker 514 and/or other warning device of the vehicle system 470 indicating that seat belts are worn properly and permit the vehicle to move to the intended destination. This may include no longer limiting the vehicle operations, such as vehicle speed, directions of travel, etc. No warning signal is generated at 616. Operation 602 may be performed subsequent to operation 616.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

FIG. 25 shows an example Wheatstone bridge 930 including four resistances R1-R4. One or more of the resistances may be replaced with one or more routing detection sensors disclosed herein. Terminals 932 may receive an input voltage $U_A$ and terminals 934 may provide an output voltage $U_B$, which may be detected by seat belt module 480 of FIG. 19. A Wheatstone bridge may be used for the routing detection sensors associated with each seat belt buckle of a vehicle.

The above-described examples provide the ability to detect seatbelt misuse and improve proper use of seat belts in vehicles. This may allow for reduced use and/or need of air bags and increase feasibility of various different types of transportation vehicles. The examples may provide an improved ability to detect whether seat belts are properly worn over vision based sensing, and seat belt webbing payout based approaches. The examples allow for this detection on seats, which are position adjustable. The described examples may be used for conventional vehicle seating positions and also for future autonomous vehicles which may have non-traditional seating positions such as rearward facing, side facing, or rotating seating positions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

Although the terms first, second, third, etc. may be used herein to describe various brackets, straps, sensors, signals, elements, and/or components, these items should not be limited by these terms. These terms may only be used to distinguish one item from another item. Terms such as "first," "second," and other numerical terms when used herein do not necessarily imply a sequence or order unless clearly indicated by the context. Thus, a first item discussed herein could be termed a second item and a second item could be termed a first item without departing from the teachings of the example implementations.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A seat belt routing sensing system for a seat belt of a vehicle, wherein the seat belt includes a latch plate, and wherein the latch plate is configured to be received in a seat belt buckle, the seat belt routing sensing system comprising:
a seat belt buckle mounting assembly comprising a first bracket or a first strap, which is distinct from the seat belt, wherein the first bracket or the first strap is configured to connect to the seat belt buckle; and
a sensor attached directly or indirectly to one of the first bracket, the first strap and the seat belt buckle and configured to detect changes in a parameter, wherein the changes are directly related to
(i) at least one of (a) a bending moment of the first bracket, the first strap or the seat belt buckle, (b) a force of the first bracket, the first strap or the seat belt buckle, (c) an angular position of the first bracket, the first strap or the seat belt buckle, or (d) an angular movement of the first bracket, first strap or the seat belt buckle, and
(ii) routing of the seat belt.

2. The seat belt routing sensing system of claim 1, wherein the sensor is configured to output a signal indicative of (i) a mass and vibration pattern experienced by the first bracket, the first strap and the seat belt buckle, or (ii) mass and vibration harmonics experienced by the first bracket, the first strap and the seat belt buckle.

3. The seat belt routing sensing system of claim 1, further comprising a sensor circuit including a Wheatstone bridge, wherein:
the sensor is attached to the first bracket; and
the Wheatstone bridge includes the sensor.

4. The seat belt routing sensing system of claim 1, wherein:
the seat belt buckle mounting assembly further comprises at least one joint; and
the at least one joint is gimbaled or bendable.

5. The seat belt routing sensing system of claim 4, wherein:
the seat belt buckle mounting assembly comprises a second bracket, and
one of a cable and a pivot providing the at least one joint;
the first bracket and the second bracket are attached to the at least one joint; and
the sensor is mounted to one of the first bracket and the second bracket.

6. The seat belt routing sensing system of claim 5, further comprising a routing member attached to one of the first bracket and the second bracket, wherein:
the cable is wrapped around the routing member and held on to the one of the first bracket or the second bracket to which the routing member is attached; and
ends of the cable are attached to the other one of the first bracket or the second bracket to which the routing member is not attached.

7. The seat belt routing sensing system of claim 1, comprising the first bracket and the first strap, wherein:
the first bracket has an offset portion, a first end and a second end;
the first strap extends over the offset portion;
a first end of the first strap is attached to the first end of the first bracket;
a second end of the first strap is attached to the second end of the first bracket; and
the sensor is attached to the strap.

8. The seat belt routing sensing system of claim 1, comprising the first bracket and the first strap and further comprising a second bracket, wherein:
the first bracket and the second bracket together provide at least a portion of a pivot having an offset portion;
the first strap extends over the offset portion;
a first end of the first strap is attached to the first bracket;
a second end of the first strap is attached to the second bracket; and
the sensor is attached to the strap.

9. The seat belt routing sensing system of claim 1, comprising the first bracket and the first strap, and further comprising:
at least one joint including at least one of a gimbaled joint, a first bendable joint or a second bendable joint;
a second bracket connected to the first bracket via the at least one joint, wherein the first strap is connected to the first bracket and the second bracket, and wherein the sensor is attached to the first strap;
a second strap connected to the first bracket and the second bracket; and
a second sensor attached to the second strap.

10. The seat belt routing sensing system of claim 1, comprising the first bracket and the first strap, and further comprising:
a second bracket, wherein the first strap is connected to the first bracket and to the second bracket, wherein the second bracket is configured to be pivoted relative to the first bracket via a pivot, and wherein the first strap extends across the pivot; and
a first holding member attached to at least one of the first bracket or the second bracket and configured to hold the sensor.

11. The seat belt routing sensing system of claim 10, further comprising:
a mounting member; and
a first strap comprising a spring portion and an elongated portion,
wherein
the spring portion is disposed on a first side of the first holding member, and
the elongated portion is disposed on a second side of the first holding member.

12. The seat belt routing sensing system of claim 10, further comprising a third bracket (i) connected to and configured to pivot relative to the first bracket in a first angular direction associated with a first plane, and (ii) connected to the second bracket and configured to pivot relative to the second bracket in a second angular direction associated with a second plane.

13. The seat belt routing sensing system of claim 10, further comprising:
a second sensor;
a second strap connected to the first bracket and to the second bracket; and
a second holding member attached to one of the first bracket and second bracket and configured to hold the second sensor.

14. A vehicle system comprising:
the seat belt routing sensing system of claim 1;
a seat belt module configured to generate an output signal based on an output of the sensor; and
at least one of
an occupant warning module configured to, based on the output signal, generate a warning to the occupant, or
a vehicle control module configured to, based on the output signal, generate a control signal to prevent or limit operation of a propulsion system of the vehicle.

15. A method of operating a vehicle system based on whether a seat belt is properly worn, wherein the seat belt includes a latch plate, and wherein the latch plate is configured to be received in a seat belt buckle, the method comprising:
detecting, via a sensor, a parameter of a bracket, a strap or the seat belt buckle, wherein at least one of the bracket, the strap or the seat belt buckle is implemented as part of a seat belt routing sensing system, wherein the parameter is directly related to (i) a bending moment of the bracket, the strap or seat belt buckle, (ii) a force of the bracket, the strap or seat belt buckle, (iii) an angular position of the bracket, the strap or seat belt buckle, or (iv) an angular movement of the bracket, first strap or seat belt buckle, and wherein the bracket or strap is distinct from the seat belt and is connected to the seat belt buckle;
comparing the parameter to thresholds to determine if the parameter is within a predetermined range, wherein the predetermined range corresponds to the seat belt being worn properly;
if the parameter is within the predetermined range, determining that the seat belt is properly worn and permitting certain vehicle operations; and
if the parameter is outside the predetermined range, determining that the seat belt is improperly worn and generating at least one of (i) a warning signal, or (ii) preventing or limiting the certain vehicle operations.

16. The method of claim 15, further comprising:
detecting, via the sensor, a mass and vibration pattern of at least one of the bracket, the strap or the seat belt buckle or mass and vibration harmonics of at least one of the bracket, the strap or the seat belt buckle;
performing a second comparison between the mass and vibration pattern or mass and vibration harmonics and a predetermined mass and vibration pattern or predetermined mass and vibration harmonics; and
determining whether the seat belt is properly worn based on results of the second comparison.

17. The method of claim 15, wherein the thresholds are modified by a seatbelt routing sensor correction factor determined based on at least one of a seat position sensor input or an occupant size sensor input.

18. The method of claim 17, further comprising determining the seatbelt routing sensor correction factor based on at least one of a composite seat position or a composite occupant size.

19. The method of claim 15, further comprising determining whether the seat belt is buckled based on the parameter, wherein:
the determining of whether the seat belt is buckled is performed (i) independent of an output of a latch plate sensor of the seat belt buckle, or (ii) without detecting an output of the latch plate sensor; and
the determining of whether the seat belt is properly worn is performed if the seat belt is determined to be buckled.

20. A seat belt routing sensing system for a seat belt of a vehicle, wherein the seat belt includes a latch plate, the seat belt routing sensing system comprising:
a seat belt buckle mounting assembly comprising at least one bracket and a strap, wherein the at least one bracket and the strap are configured to connect to a seat belt buckle; and
a sensor attached directly or indirectly to one of the (a) at least one bracket, (b) the strap and (c) the seat belt buckle, wherein the sensor is configured to detect changes in a parameter, wherein the changes are indicative of
(i) at least one of a bending moment, a force, an angular position, or an angular movement of the at least one bracket, the strap or the seat belt buckle, and
(ii) routing of the seat belt,
wherein
the at least one bracket comprises at least one of an offset portion or a joint,
the strap is attached to the at least one bracket and extends across the at least one of the offset portion or the joint, and
the sensor is attached to the strap.

* * * * *